United States Patent
Shintani et al.

(10) Patent No.: US 11,943,544 B2
(45) Date of Patent: Mar. 26, 2024

(54) IMAGE CAPTURING APPARATUS CAPABLE OF DETECTING FLICKER DUE TO PERIODIC CHANGE IN LIGHT AMOUNT OF OBJECT, METHOD OF CONTROLLING SAME, AND NON-TRANSITORY COMPUTER-READABLE STORAGE MEDIUM

(71) Applicant: CANON KABUSHIKI KAISHA, Tokyo (JP)

(72) Inventors: Takuya Shintani, Kanagawa (JP); Takashi Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 114 days.

(21) Appl. No.: 17/678,767

(22) Filed: Feb. 23, 2022

(65) Prior Publication Data

US 2022/0272250 A1    Aug. 25, 2022

(30) Foreign Application Priority Data

Feb. 25, 2021    (JP) ................ 2021-028809

(51) Int. Cl.
*H04N 23/745* (2023.01)
*H04N 23/71* (2023.01)
*H04N 23/73* (2023.01)

(52) U.S. Cl.
CPC ........... *H04N 23/745* (2023.01); *H04N 23/71* (2023.01); *H04N 23/73* (2023.01)

(58) Field of Classification Search
CPC ...... H04N 23/745; H04N 23/71; H04N 23/73; H04N 23/634; H04N 23/54; H04N 23/55; H04N 23/74; H04N 25/57
See application file for complete search history.

(56) References Cited

U.S. PATENT DOCUMENTS

| 8,970,716 | B2 * | 3/2015 | Kodama | H04N 23/71 |
| | | | | 348/220.1 |
| 9,609,232 | B2 * | 3/2017 | Nakagawara | H04N 23/745 |
| 10,104,309 | B2 * | 10/2018 | Onodera | H04N 25/60 |
| 10,721,416 | B2 * | 7/2020 | Kunishige | H04N 23/73 |

(Continued)

FOREIGN PATENT DOCUMENTS

| EP | 3 099 058 A1 | 11/2016 |
| JP | 2014220763 A | 11/2014 |

*Primary Examiner* — Luong T Nguyen
(74) *Attorney, Agent, or Firm* — CANON U.S.A., INC. IP Division

(57) ABSTRACT

An image capturing apparatus includes a determination unit configured to determine a first shutter speed based on a reciprocal of a light amount change frequency of detected flicker and a selection unit configured to select a second shutter speed as a candidate in capturing an image of the object with reduced effect of the flicker. If a third shutter speed is set in advance, the determination unit determines a closer one of shutter speeds to the third shutter speed than the others as the first shutter speed, wherein the shutter speeds being integer multiples of a shutter speed that is the reciprocal of the light amount change frequency of the flicker detected. The selection unit selects one of settable shutter speeds of the image capturing apparatus as the second shutter speed, wherein the one has a smaller difference from the first shutter speed than the others.

28 Claims, 19 Drawing Sheets

(56) References Cited

U.S. PATENT DOCUMENTS

2013/0342726 A1     12/2013  Ebina
2019/0199906 A1*    6/2019   Honda .................. H04N 23/73
2019/0289190 A1     9/2019   Kunishige

* cited by examiner

FIG.2

| Step | 1/4 | | | |
|---|---|---|---|---|
| Index (i) | 1 | 2 | 3 | 4 |
| Shutter speed (sec) | 1/8192.0 | 1/6888.6 | 1/5792.6 | 1/4871.0 |

| Step | 1/8 | | | |
|---|---|---|---|---|
| Index (i) | 5 | 6 | ... | 11 | 12 |
| Shutter speed (sec) | 1/4096.0 | 1/3756.0 | ... | 1/2435.5 | 1/2233.4 |

| Step | 1/16 | | | |
|---|---|---|---|---|
| Index (i) | 13 | 14 | ... | 27 | 28 |
| Shutter speed (sec) | 1/2048.0 | 1/1961.2 | ... | 1/1116.7 | 1/1069.3 |

| Step | 1/32 | | | |
|---|---|---|---|---|
| Index (i) | 29 | 30 | ... | 59 | 60 |
| Shutter speed (sec) | 1/1024.0 | 1/1002.1 | ... | 1/534.7 | 1/523.2 |

| Step | 1/64 | | | |
|---|---|---|---|---|
| Index (i) | 61 | 62 | ... | 123 | 124 |
| Shutter speed (sec) | 1/512.0 | 1/506.5 | ... | 1/261.6 | 1/258.8 |

| Step | 1/128 | | | |
|---|---|---|---|---|
| Index (i) | 125 | 126 | ... | 251 | 252 |
| Shutter speed (sec) | 1/256.0 | 1/254.6 | ... | 1/129.4 | 1/128.7 |

| Step | 1/256 | | | |
|---|---|---|---|---|
| Index (i) | 253 | 254 | ... | 599 | 600 |
| Shutter speed (sec) | 1/128.0 | 1/127.7 | ... | 1/50.2 | 1/50.0 |

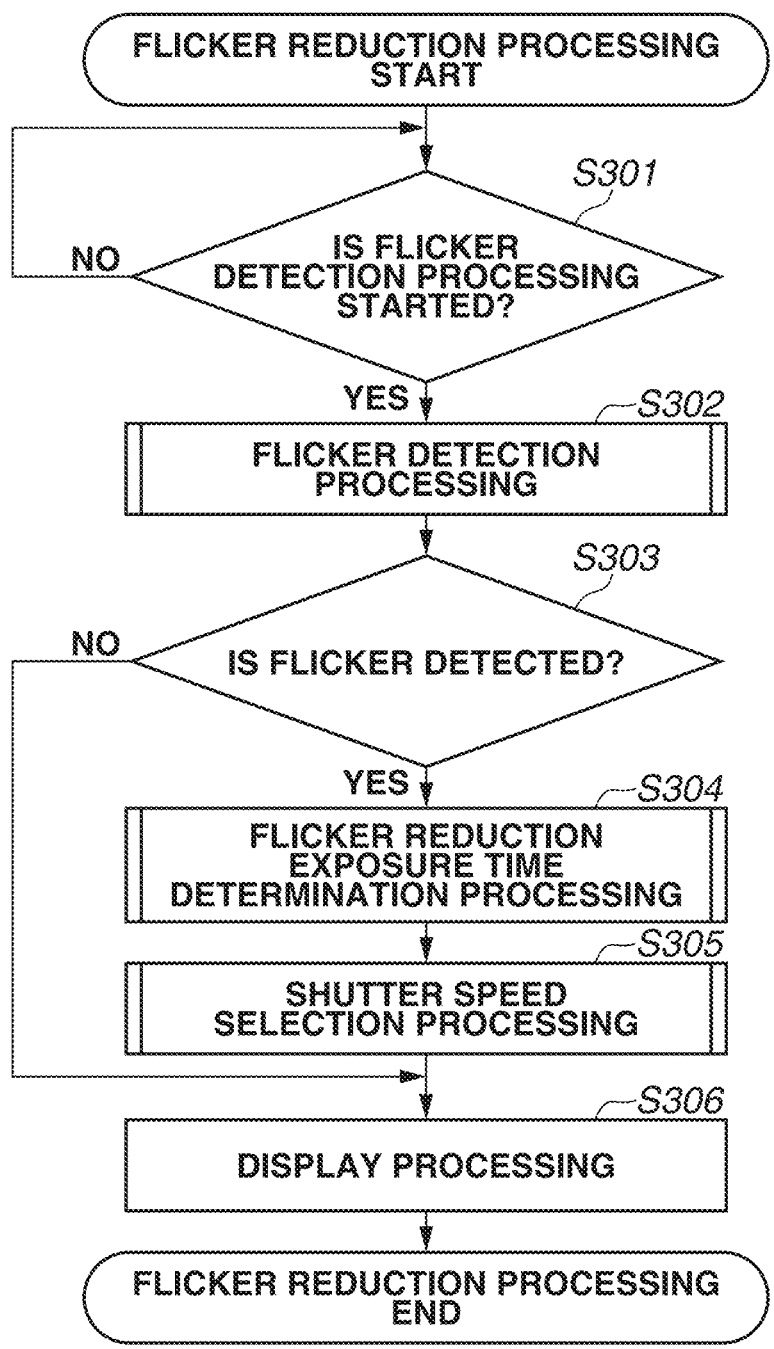

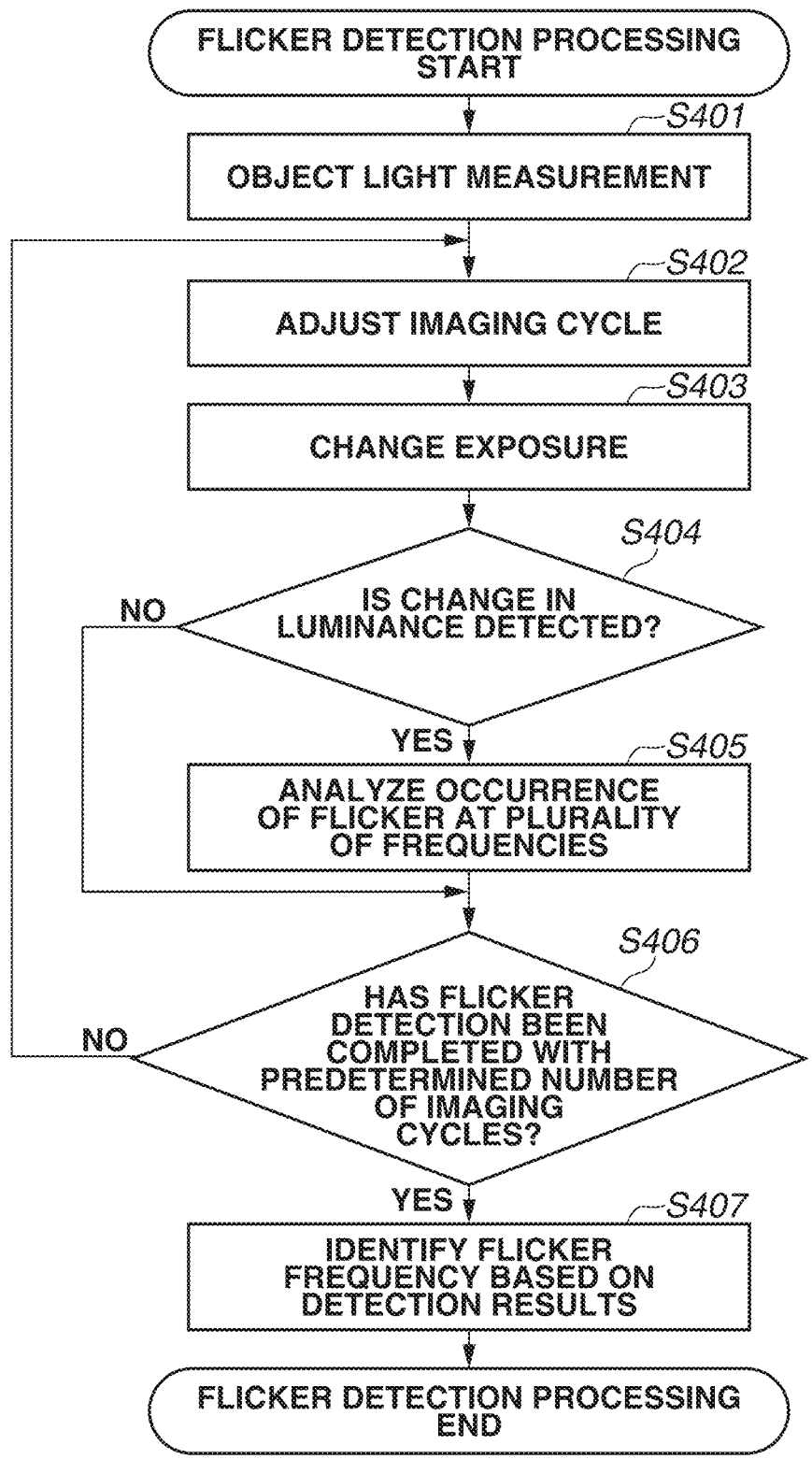

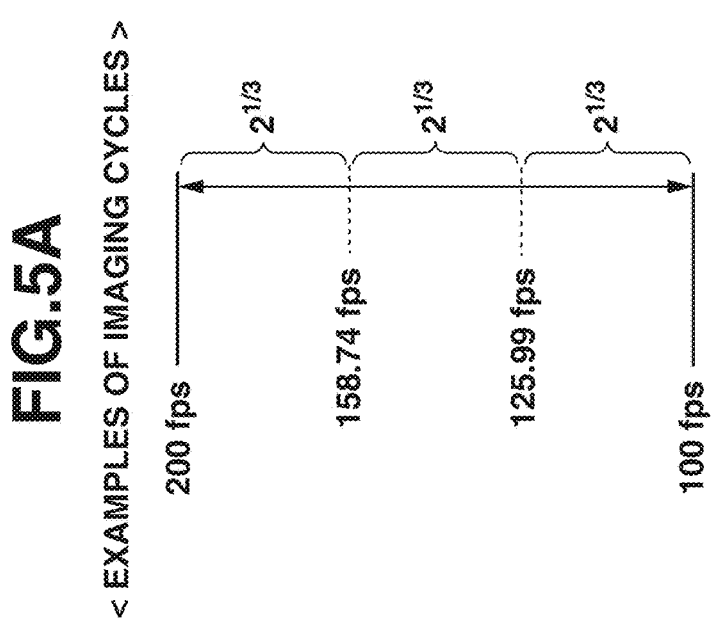

< EXAMPLES OF IMAGING CYCLES >

< EXAMPLES OF DETECTION TARGET FREQUENCIES >

| IMAGING CYCLE | 167 fps | 100 fps | 133 fps |
|---|---|---|---|
| DETECTION TARGET FREQUENCY | (A) 50-67 Hz | (G) 67-83 Hz | (M) 83-100 Hz |
| | (B) 100-133 Hz | (H) 133-167 Hz | (N) 167-200 Hz |
| | (C) 200-266 Hz | (I) 266-333 Hz | (O) 333-400 Hz |
| | (D) 400-522 Hz | (J) 522-667 Hz | (P) 667-800 Hz |
| | (E) 800-1067 Hz | | |

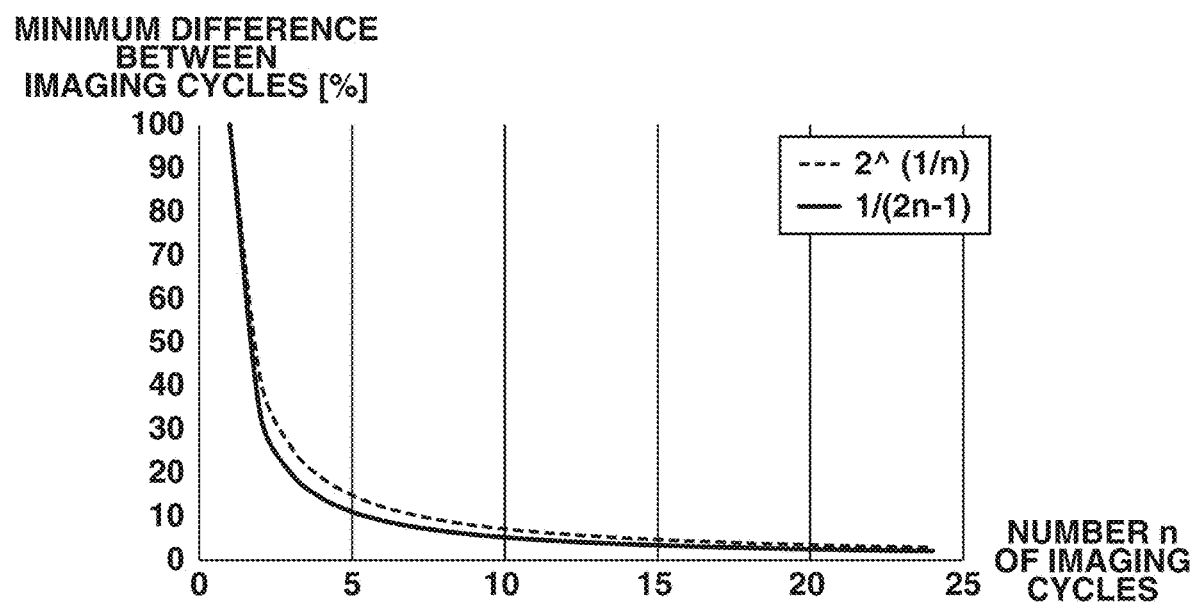

FIG.8
BLINKING OF
LIGHT SOURCE
CAPTURED
IMAGE
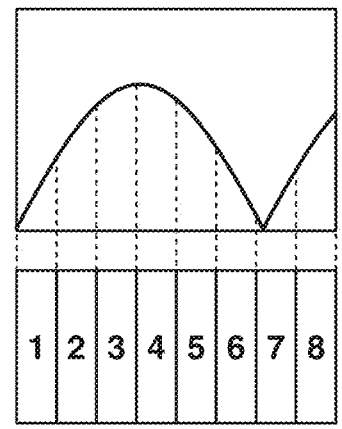
CHANGE IN
LUMINANCE
OF IMAGE

FIG.10

|         | Tv1   | Tv2   | ... | TvN          |
|---------|-------|-------|-----|--------------|
| 100 fps | 1/100 | 1/200 | ... | 1/(100 × N)  |
| 126 fps | 1/126 | 1/252 | ... | 1/(126 × N)  |
| 159 fps | 1/159 | 1/318 | ... | 1/(159 × N)  |

FIG.11

|  | Tv1 | Tv2 | ... | TvN |
|---|---|---|---|---|
| 100 fps | 1/100 | 1/200 | ... | 1/(100 × N) |
| 133 fps | 1/133 | 1/266 | ... | 1/(133 × N) |
| 167 fps | 1/167 | 1/334 | ... | 1/(167 × N) |

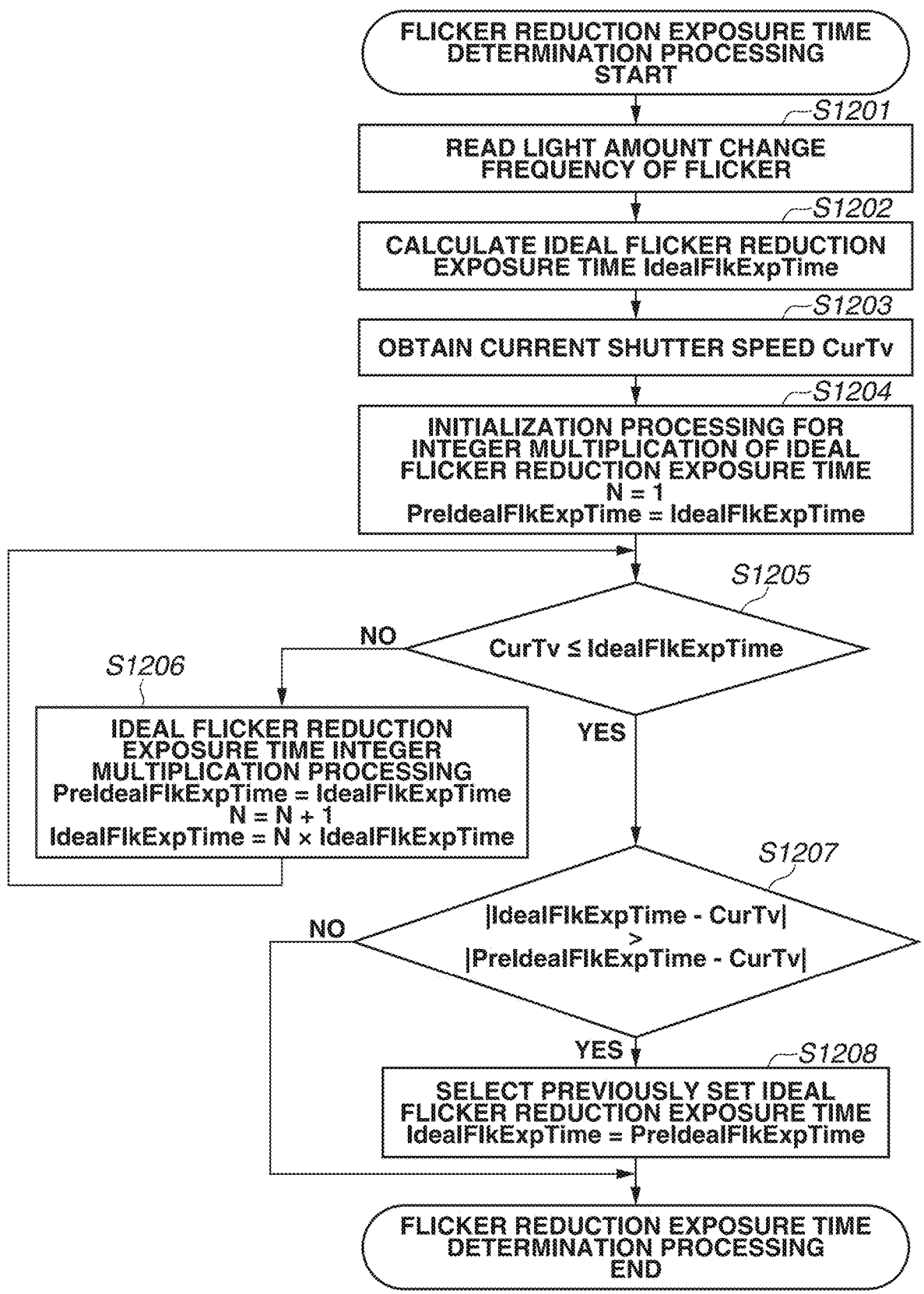

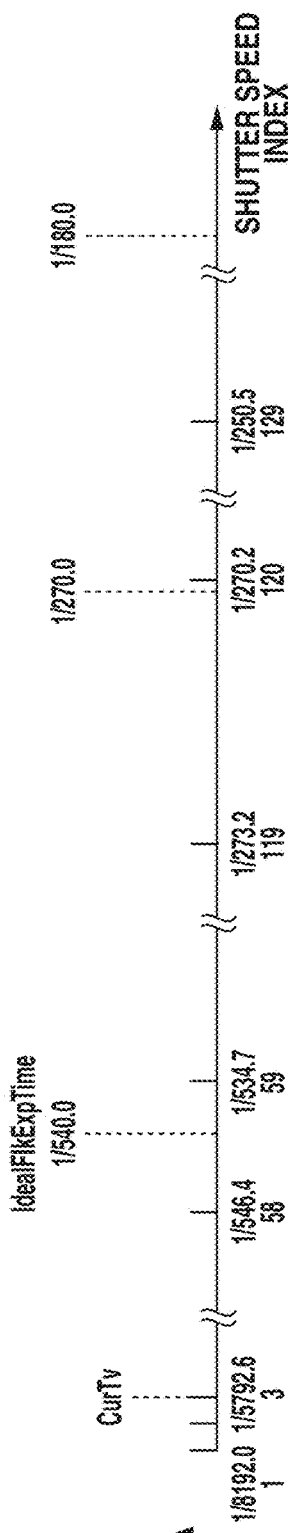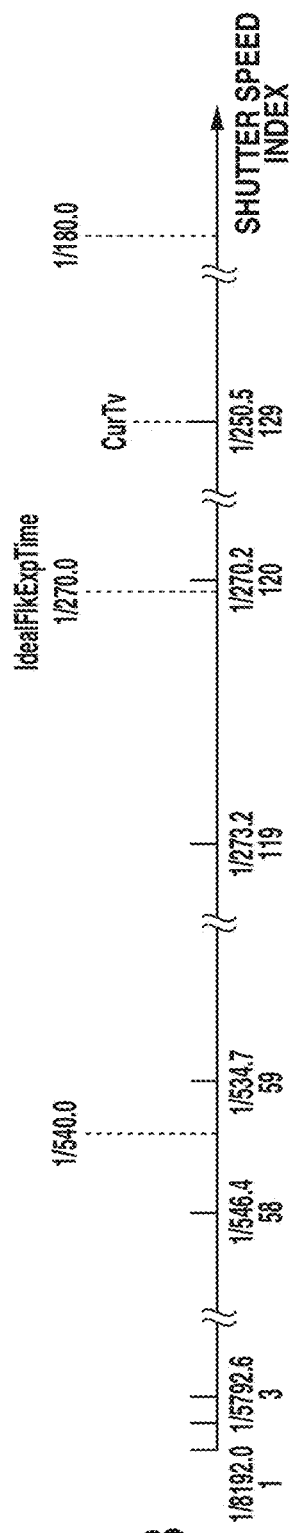
FIG.13A
FIG.13B

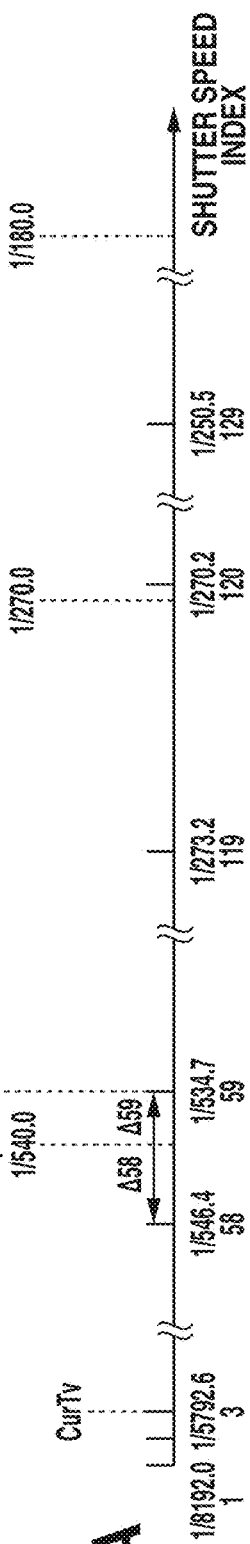

FLICKER FREQUENCY: 540.0 Hz

WHEN NO FLICKER IS DETECTED

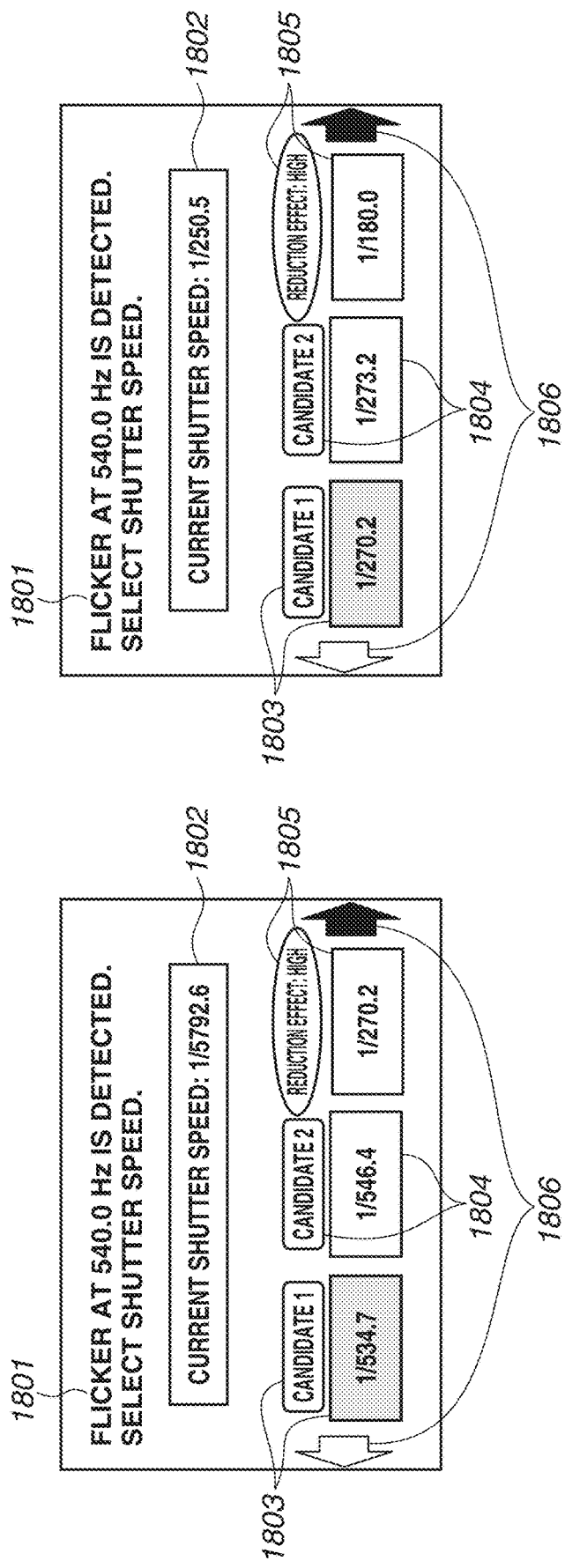
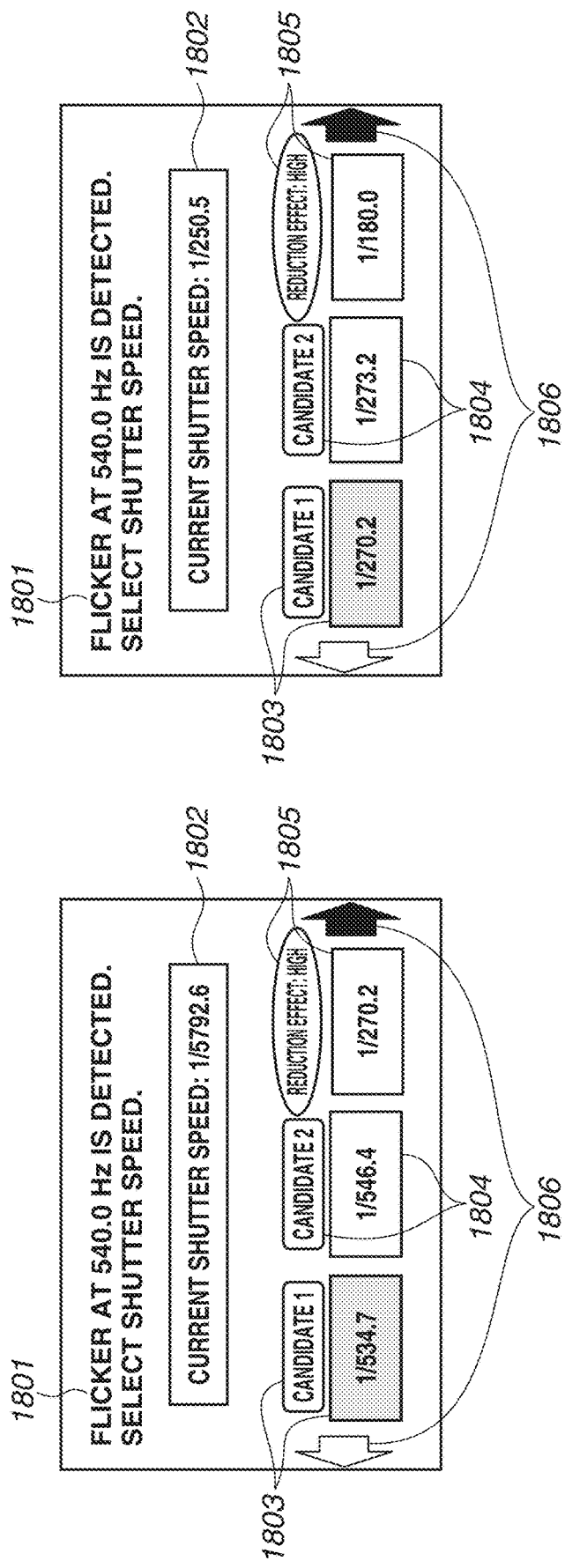

IMAGE CAPTURING APPARATUS CAPABLE OF DETECTING FLICKER DUE TO PERIODIC CHANGE IN LIGHT AMOUNT OF OBJECT, METHOD OF CONTROLLING SAME, AND NON-TRANSITORY COMPUTER-READABLE STORAGE MEDIUM

BACKGROUND OF THE INVENTION

Field of the Invention

The present invention relates to an image capturing apparatus, a method of controlling the same, and a non-transitory computer-readable storage medium, and more particularly to a technique for calculating a characteristic related to a periodic change in a light amount of an object (referred to as flicker).

Description of the Related Art

Image sensors included in image capturing apparatuses such as a digital camera and a mobile phone have been improved in sensitivity in recent years. It is now becoming possible to obtain a bright image with less object blur by capturing the image of the object with a high shutter speed (short exposure time) setting even indoors or in dark environments relative to outdoors in daytime.

Fluorescent lamps commonly used as indoor light sources are known to cause flicker, which is a phenomenon that the light amount of an object image changes periodically, because of the commercial power source frequency. If images of an object are captured with the shutter speed set high under such a flickering light source, exposure unevenness or color unevenness can occur within one image (screen), as well as exposure or color temperature variations between a plurality of images obtained by continuous shooting.

Japanese Patent Application Laid-Open No. 2014-220763 discusses a technique for detecting flicker based on a plurality of images successively obtained at a rate that is the least common multiple of flicker frequencies (100 Hz and 120 Hz) due to two commercial power source frequencies of 50 Hz and 60 Hz.

Light-emitting diodes (LEDs) have been increasingly used as light sources in recent years. LEDs use a current supply method different from that of fluorescent lamps, and their driving current is controlled by a rectifier circuit. LEDs therefore change in the light amount at different cycles and with different waveforms from those of the commercial power sources. While flicker occurs under an LED light source as with a fluorescent light source, the flicker has a light amount change frequency different from under the fluorescent light source.

SUMMARY OF THE INVENTION

An image capturing apparatus includes an image sensor, a flicker detection unit configured to detect flicker that is a periodic change in a light amount of an object, a determination unit configured to determine a first shutter speed based on a light amount change frequency of the flicker detected by the flicker detection unit, wherein the first shutter speed is based on a reciprocal of the light amount change frequency of the detected flicker, and a selection unit configured to select a second shutter speed as a candidate in capturing an image of the object with reduced effect of the flicker, based on the first shutter speed determined by the determination unit, wherein the determination unit is configured to, if a third shutter speed of the image capturing apparatus is set in advance, determine a closer one of shutter speeds to the third shutter speed than the others as the first shutter speed, the shutter speeds being integer multiples of a shutter speed that is the reciprocal of the light amount change frequency of the flicker detected by the flicker detection unit, and wherein the selection unit is configured to select one of settable shutter speeds of the image capturing apparatus as the second shutter speed, the one having a smaller difference from the first shutter speed than the others.

Further features of the present invention will become apparent from the following description of embodiments with reference to the attached drawings.

BRIEF DESCRIPTION OF THE DRAWINGS

FIG. 2 is a diagram illustrating a shutter speed setting (index) table according to the present embodiment as an example.

FIG. 3 is a flowchart illustrating flicker reduction processing according to a first embodiment of the present invention.

FIG. 4 is a flowchart related to flicker detection processing according to the first embodiment of the present invention.

FIGS. 5A and 5B are diagrams illustrating a method for selecting a plurality of imaging cycles in detecting flicker according to the first embodiment of the present invention as an example.

FIG. 7 is a diagram (graph) illustrating a relationship of the method for selecting imaging cycles for flicker detection and the number of imaging cycles with a minimum difference between the imaging cycles according to the present embodiment as an example.

FIG. 8 is a diagram illustrating a change in luminance based on images successively obtained by a global shutter method as an example.

FIG. 10 is a diagram illustrating the setting values of exposure time (shutter speed) for a first pattern of a plurality of imaging cycles for flicker detection according to the first embodiment of the present invention as an example.

FIG. 11 is a diagram illustrating the setting values of the exposure time (shutter speed) for a second pattern of a plurality of imaging cycles for flicker detection according to the first embodiment of the present invention as an example.

FIG. 12 is a flowchart related to flicker reduction exposure time determination processing according to the first embodiment of the present invention.

FIGS. 13A and 13B are diagrams illustrating a method for setting an ideal flicker reduction exposure time in the presence of flicker changing in light amount at a predetermined light amount change frequency according to the first embodiment of the present invention as an example.

FIGS. 15A and 15B are diagrams illustrating a relationship between the shutter speed selected by the shutter speed selection processing according to the first embodiment of the present invention and an ideal shutter speed for reducing the effect of flicker as an example.

FIGS. 18A and 18B are diagrams illustrating a notification screen displayed on a display unit by display processing according to a second embodiment of the present invention as an example.

DESCRIPTION OF THE EMBODIMENTS

Basic Configuration of Image Capturing Apparatus

Figure 1:
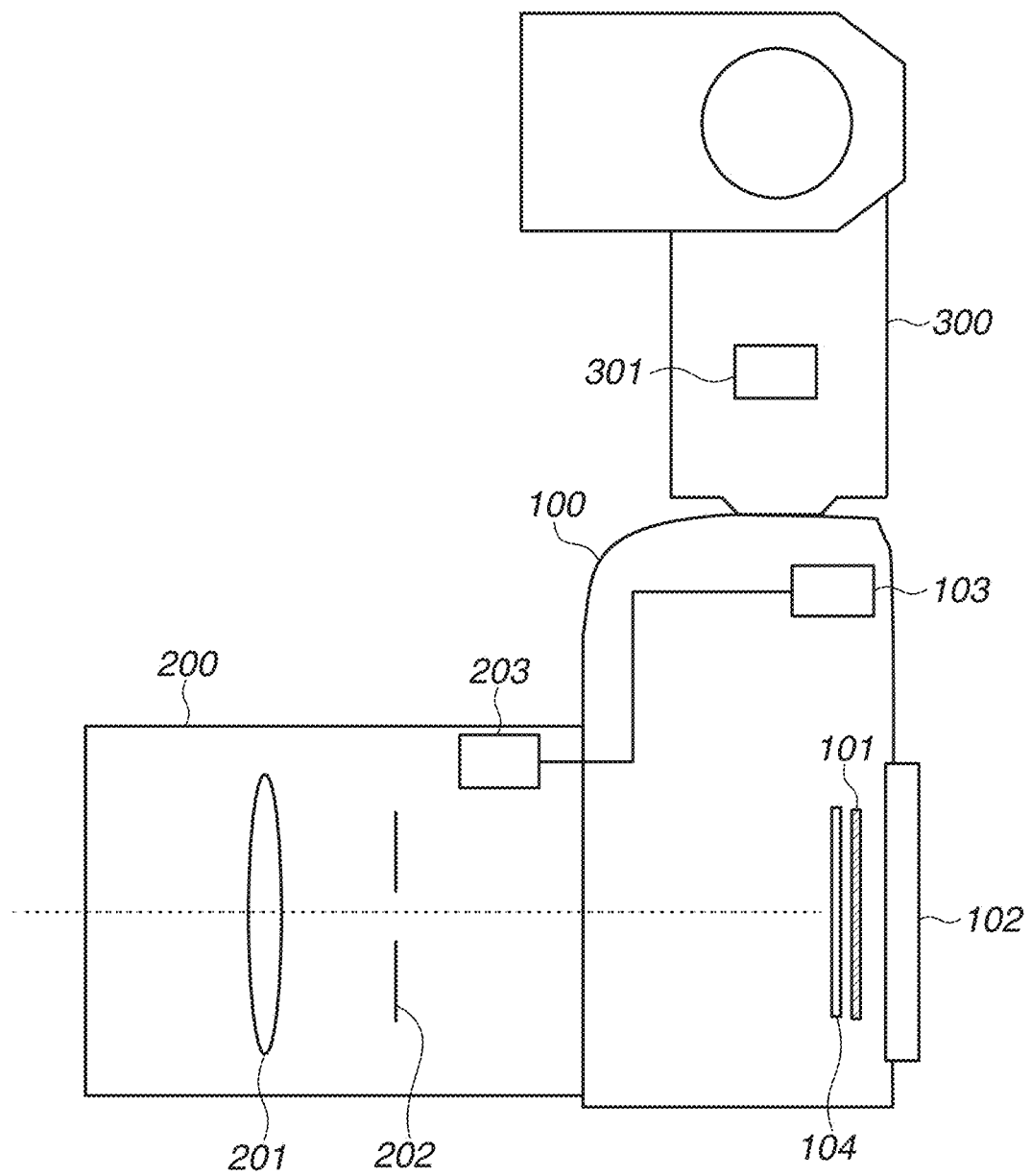
FIG. 1 is a block diagram illustrating a configuration of a camera main body that is an image capturing apparatus according to an embodiment of the present invention, a lens unit, and a light emitting device.

Embodiments of the present invention will be described below with reference to the attached drawings. A first embodiment will initially be described. FIG. 1 is a block diagram illustrating a configuration of a camera main body 100 that is an image capturing apparatus according to an embodiment of the present invention, a lens unit 200, and a light emitting device 300. One or more of the functional blocks illustrated in FIG. 1 may be implemented by hardware such as an application specific integrated circuit (ASIC) and a programmable logic array (PLA). One or more of the functional blocks may be implemented by a programmable processor (microprocessor or microcomputer) such as a central processing unit (CPU) and a micro processing unit (MPU) executing software. One or more of the functional blocks may be implemented by a combination of software and hardware.

In the following description, the same piece of hardware can perform operations even if different functional blocks are described to perform the operations.

Components of the camera main body 100 will be described. The camera main body 100 includes a frame memory (not illustrated) and functions as a storage unit that can temporarily store a signal (video signal) and from which the signal can be read as appropriate. Frame memories are typically also referred to as random access memories (RAMs). Dual Data Rate 3 Synchronous Dynamic RAMs (DDR3-SDRAMs) have often been used in recent years. The use of such a frame memory enables various types of processing.

An image sensor 101 is an imaging unit using a solid image sensor of charge accumulation type, such as a complementary metal-oxide-semiconductor (CMOS) sensor and a charge-coupled device (CCD) sensor. The image sensor 101 can receive a light flux guided from an object into the camera main body 100 via the lens unit 200 and convert the light flux into an electrical image signal. An image (signal) obtained using the image sensor 101 under driving control by a CPU 103 to be described below is handled as various image signals for a live view display, for flicker detection, and as a captured image for recording. Since the electrical signal obtained by the image sensor 101 has an analog value, the image sensor 101 also has a function of converting the analog value into a digital value. An evaluation value (photometric value) related to the brightness of the object can be detected based on the image signal output from the image sensor 101. An exposure time of the image sensor 101 can be controlled based on a shutter speed that can be set as an exposure control value related to the image sensor 101.

A mechanical shutter 104 is a light shielding unit that can run in a direction parallel to a signal scanning direction of the image sensor 101. The mechanical shutter 104 can control the exposure time of the image sensor 101 by adjusting an exposure aperture formed by a plurality of shutter blades included in the mechanical shutter 104 based on the foregoing shutter speed. The adjustment of the exposure time according to the present embodiment can be implemented using an electronic shutter, the mechanical shutter 104, or both the electronic shutter and the mechanical shutter 104. The electronic shutter is implemented by adjusting signal reset and read timing of the image sensor 101.

A display unit 102 is a display device that a user can visually observe. The user can check an operation status of the camera main body 100 on the display unit 102. For example, the display unit 102 displays a video image to which image processing has been applied based on the image signal of the object, and a setting menu. A thin-film transistor (TFT) liquid crystal display is used for a display element of the display unit 102. A liquid crystal display (LCD) or an organic electroluminescence (EL) display may be used as the display unit 102. Images obtained by the image sensor 101 and setting conditions, such as exposure control values, can be displayed on the display unit 102 in real time while capturing the images of the object, i.e., a live view display can be provided. The display unit 102 according to the present embodiment includes a resistive or capacitive thin film device called touch panel, and also serves as an operation unit on which the user can make touch operations.

The CPU 103 is a control unit that can control the camera main body 100 and accessory units attached to the camera main body 100 in a centralized manner. A read-only memory (ROM) and a RAM are connected to the CPU 103. The ROM (not illustrated) is a nonvolatile recording device, and records programs for operating the CPU 103 and various adjustment parameters. The programs read from the ROM are loaded into the volatile RAM (not illustrated) and executed. The RAM is typically a low-speed low-capacity device compared to the frame memory (not illustrated).

Next, details of the lens unit 200 will be described. The lens unit 200 is an accessory attachable to and detachable from the camera main body 100. The lens unit 200 is an interchangeable lens that includes a lens group 201 including a focus lens, a zoom lens, and a shift lens. For example, the focus lens included in the lens group 201 can make a focus adjustment to the object by adjusting the lens position in an optical axis direction of the lens.

A diaphragm 202 is a light amount adjustment member for adjusting the light amount of the light flux guided from the object into the camera main body 100 via the lens unit 200. In the present embodiment, the light amount can be adjusted by adjusting an aperture diameter of the diaphragm 202. The light amount is adjusted by changing an aperture value serving as an exposure control value related to the aperture diameter of the diaphragm 202.

A lens processing unit (LPU) 203 is a control unit that controls various components of the lens unit 200. For example, the LPU 203 can control driving of the lens group 201 and the diaphragm 202. The LPU 203 is connected to the CPU 103 of the camera main body 100 via a not-illustrated terminal group, and can drive the components of the lens unit 200 based on control instructions from the CPU 103.

Next, details of the light emitting device 300 will be described. The light emitting device 300 is an external light emitting device attachable to and detachable from the camera main body 100 via a not-illustrated connection section on the camera main body 100. A strobe processing unit (SPU) 301 is a control unit that controls various components of the light emitting device 300, and capable mainly of light emission control and communication control with the camera man body 100. The SPU 301 is connected to the CPU 103 of the camera main body 100 via a not-illustrated contact group, and can drive various components of the light emitting device 300 based on control instructions from the CPU 103.

While the components of the image capturing apparatus according to the first embodiment of the present invention have been described above, the present invention is not limited to the foregoing configuration. For example, the camera main body 100 may include built-in devices corresponding to the lens unit 200 and the light emitting device 300.

Method for Setting Shutter Speed

Next, a method for setting the shutter speed that is an exposure control value for controlling the exposure time of the image sensor 101 according to the present embodiment will be specifically described with reference to FIG. 2. FIG. 2 is a diagram illustrating a shutter speed setting (index) table according to the present embodiment.

Shutter speed is typically known to be changeable in units of ½ or ⅓ steps of light amount. In the present embodiment, to cope with flicker occurring under light-emitting diode (LED) light sources that blink periodically at various frequencies, the shutter speed is adjustable in finer steps. Specifically, in the present embodiment, shutter speeds of 1/8192.0 to 1/4871.0 sec can be adjusted in units of ¼ steps, and 1/4096.0 to 1/2233.4 sec in units of ⅛ steps. Shutter speeds of 1/2048.0 to 1/1069.3 sec can be adjusted in units of 1/16 steps, and 1/1024.0 to 1/523.2 sec in units of 1/32 steps. Shutter speeds of 1/512.0 to 1/258.8 sec can be adjusted in units of 1/64 steps, 1/256.0 to 1/128.7 sec in units of 1/128 steps, and 1/128.0 to 1/50.0 sec in units of 1/256 steps.

In the shutter speed setting table illustrated in FIG. 2, some of the shutter speeds are omitted for the sake of viewability. The numerical index values in the shutter speed setting table illustrated in FIG. 2 are used in shutter speed selection processing for reducing flicker to be described below.

The camera main body 100 according to the present embodiment preferentially uses the electronic shutter to allow free setting of the shutter speed, ranging from the foregoing high shutter speed shorter than 1/8000 sec to not-illustrated low shutter speeds longer than 1/50 sec. The user can change the shutter system setting (to singly use the electronic shutter or the mechanical shutter 104 or use the electronic shutter and the mechanical shutter 104 in combination) anytime, for example, by making manual operations via a menu screen displayed on the display unit 102.

Flicker Reduction Processing

Next, flicker reduction processing according to the present embodiment will be described with reference to the flowchart illustrated in FIG. 3. FIG. 3 is a flowchart illustrating the flicker reduction processing according to the first embodiment of the present invention.

The flicker reduction processing is started in response to a predetermined operation, such as the user's manual operation based on a menu display displayed on the display unit 102. The flicker reduction processing according to the present embodiment is processing for controlling the occurrence of flicker-based variations in a moving image such as a live view display by setting a shutter speed (i.e., exposure time) that reduces the effect of detected flicker. The flicker reduction processing according to the present embodiment is however not limited thereto. For example, the camera main body 100 may be configured to reduce flicker by applying a gain to reduce variations to the image aside from adjusting the shutter speed.

When the flicker reduction processing is started, the CPU 103 initially repeats the processing of step S301 until flicker detection processing is started. In step S301, in a case where it is determined that the flicker detection processing is started (YES in step S301), the processing proceeds to step S302. In step S302, the CPU 103 performs the flicker detection processing. Details of the flicker detection processing will be described below.

In step S303, the CPU 103 determines whether flicker is detected based on the result of the processing of step S302. In step S303, in a case where it is determined that flicker is detected (YES in step S303), the processing proceeds to step S304. In a case where it is determined that no flicker is detected (NO in step S303), the processing proceeds to step S306. It is determined that flicker is detected if flicker of predetermined level or higher has occurred. A method for calculating the flicker level will be described below.

In step S304, the CPU 103 determines an exposure time (shutter speed) that allows the effect of the detected flicker to be reduced (flicker reduction exposure time determination processing). Details of the flicker reduction exposure time determination processing will be described below.

In step S305, the CPU 103 performs shutter speed selection processing for selecting a shutter speed that can reduce the effect of the flicker based on information about the exposure time suitable for flicker reduction determined in step S304. Details of the shutter speed selection processing will be described below.

In step S306, the CPU 103 performs display processing for displaying the result of the flicker detection (i.e., whether flicker is detected) and a value selectable as the shutter speed that can reduce the effect of the flicker as a result of the processing of steps S304 and S305. Details of the display processing will be described below. By such flicker reduction processing, an image with the effect of flicker reduced can be obtained, and image display and recording can be performed based on the image, regardless of the frequency of the flicker.

Flicker Detection Processing

Next, the flicker detection processing according to the present embodiment will be described with reference to FIG. 4. As described above, LED light sources, unlike light sources such as a fluorescent lamp, cause changes (blinking) in the light amount, i.e., flicker, at a frequency different from the power supply frequency for driving the light sources since the driving current thereof is controlled by a rectifier circuit. In detecting flicker caused by light sources such as an LED light source, the frequencies targeted for detection are therefore unable to be narrowed down to certain numerical values like the driving power supply frequency. The occurrence of flicker is therefore to be analyzed over a wide range of frequencies.

If the light amount change frequency of flicker (blinking cycle of the light source) is the same as or an integer multiple of the imaging cycle in successively capturing images of an object (hereinafter, such a state will be referred to as synchronization), changes (blinking) in the light amount between the successively obtained images are small. In such a case, for example, a live view display of successively displaying the images is free of a drop in image quality like flicker-based variations. However, a still image obtained by imaging at a given shutter speed can suffer exposure unevenness due to flicker. Moreover, even if the imaging frame rate of the images for the live view display is the same as the light amount change frequency of flicker, a moving image for recording obtained at a different frame rate can suffer exposure unevenness or luminance unevenness due to the flicker.

There is a known method for identifying the light amount change frequency of flicker by detecting and comparing differences in the light amount (brightness level) between the images obtained by successive imaging. If such a method is used to identify the light amount change frequency of flicker, the light amount change frequency of the flicker and the imaging cycle (frame rate) are desirably adjusted to not be synchronous.

In the present embodiment, the occurrence of flicker is thus detected by analyzing the light amount change frequency of flicker at a plurality of frequencies (imaging cycles). Such a method can prevent the light amount change frequency of flicker and the imaging cycle from being fully synchronous and enables effective flicker detection processing over a wide range of frequencies by analyzing the light amount change frequency of the flicker at a plurality of imaging cycles.

FIG. 4 is a flowchart related to the flicker detection processing according to the first embodiment of the present invention. As illustrated in FIG. 4, in step S401, the CPU 103 performs photometric operations on the object (object light measurement) to determine exposure in capturing images of the object for the flicker detection processing. Any method may be used for the photometric operations. For example, in the present embodiment, the CPU 103 obtains an evaluation value based on an average of image signals obtained by performing charge accumulation for photometric operations using the image sensor 101. The CPU 103 then determines a representative luminance (photometric value) of the object as the result of the light measurement based on the obtained evaluation value. To calculate the photometric value, the angle of view corresponding to the image signals is divided into a plurality of blocks. Signals output from pixels corresponding to each block are averaged, and the averages determined in the respective blocks are arithmetically averaged to calculate the photometric value (representative luminance). The photometric value is in units such that Bv=1 in the Additive System of Photographic Exposure (APEX) system corresponds to one step of the luminance value. However, other units may be used.

In step S402, the CPU 103 adjusts the imaging cycle to an imaging cycle for flicker detection (non-frame rate). Details of a method for adjusting the imaging cycle for flicker detection will be described below.

In step S403, the CPU 103 determines exposure control values (changes exposure) based on the determined photometric value. In the present embodiment, the exposure control values refer to parameters capable of adjusting the brightness of the captured image of the object. The exposure control values include the shutter speed (i.e., accumulation time), an aperture value, and imaging sensitivity (International Organization for Standardization (ISO) speed). The determined exposure control values are stored in the RAM described above. The camera main body 100 changes its exposure and starts to obtain images for flicker detection.

In step S404, the CPU 103 determines whether the luminance of the obtained images changes (i.e., whether flicker occurs). The CPU 103 determines the presence or absence of a change in the luminance based on the obtained images, since flicker is unable to be correctly detected if the blinking cycle of the light source and the imaging cycle of the object are synchronous as described above. In a case where it is determined that no change in luminance is detected in the obtained images (NO in step S404), the processing proceeds to step S406. In other words, flicker detection operations at the current frame rate (imaging cycle) are skipped based on the determination that the imaging cycle and the light amount change frequency of the flicker related to the object are synchronous or there is no flicker.

In a case where a change in luminance is detected in the obtained images (YES in step S404), the processing proceeds to step S405. In step S405, the CPU 103 analyzes (detects) the occurrence of flicker at a plurality of different frequencies. Details of the method of detecting flicker at a plurality of frequencies in step S405 will be described below.

In step S406, the CPU 103 determines whether flicker detection has been completed with a predetermined number (n) of imaging cycles. In a case where flicker detection is determined to not have been completed with the predetermined number of imaging cycles (NO in step S406), the processing returns to step S402. In step S402, the CPU 103 changes the imaging cycle (frame rate). The processing of step S403 and the subsequent steps is repeated.

In a case where flicker detection is determined to have been completed with the predetermined number of imaging cycles (YES in step S406), the processing proceeds to step S407. In step S407, the CPU 103 identifies the frequency of the flicker of the object based on the determination results in step S405. In the processing of step S407, the occurrence of flicker has been detected at a plurality of different frequencies with a plurality of imaging cycles (frame rates).

The CPU 103 compares the levels of flicker detected at respective frequencies, and identifies the flicker of the frequency where the level is the highest as the final detection result of the currently occurring flicker of the object. In the present embodiment, the magnitudes of changes in the light amount (the amplitudes of curves representing regular changes in the light amount) are compared as the flicker levels. However, this is not restrictive. For example, the camera main body 100 may be configured to compare the degrees of stability of changes in the light amount aside from the flicker levels.

Now, the imaging cycles (frame rates) for flicker detection mentioned above will be specifically described. As described above, the camera main body 100 according to the present embodiment performs the flicker detection processing at a plurality of imaging cycles. Suppose, for example, that the camera main body 100 detects the light amount change frequency of flicker by switching the imaging cycle between 100 fps and 120 fps. Initially, take the case of detecting the light amount change frequency of flicker at an imaging cycle of 100 fps. In such a case, flicker changing in light amount at a frequency of k×100 Hz (k is a natural number), like 100 Hz, 200 Hz, and 300 Hz that are integer multiples of the imaging cycle of 100 fps, are unable to be correctly detected because of synchronization between the imaging cycle and the light amount change frequency of the flicker. Now, take the case of detecting the light amount change frequency of flicker at an imaging cycle of 120 fps. In such a case, flicker changing in light amount at a frequency of m×120 Hz (m is a natural number), such as 120 Hz, 240 Hz, and 360 Hz that are integer multiples of the imaging cycle of 120 fps, are unable to be correctly detected because of synchronization between the imaging cycle and the light amount change frequency of the flicker. Frequencies of 600 Hz and 1200 Hz that satisfy both the conditions k×100 Hz (k is a natural number) and m×120 Hz (m is a natural number) are common multiples of 100 Hz and 120 Hz. Flicker changing in light amount at such frequencies is unable to be correctly detected by using images obtained with either of the imaging cycles of 100 fps and 120 fps since the light amount change frequency of the flicker is synchronous with both the imaging cycles of 100 fps and 120 fps.

For example, light sources including a rectifier circuit, like an LED light source, typically have an adjusted power supply frequency in the range of 50 Hz to 1000 Hz. Some LED light sources can thus flicker at the foregoing light amount change frequency of 600 Hz, and the flicker cannot be correctly detected depending on the imaging cycle. In other words, even if flicker detection is performed using images obtained with two respective imaging cycles, flicker cannot be detected correctly at some frequencies in a wide range of frequencies at which LED light sources can flicker.

In the foregoing example, flicker changing in light amount at exactly the same frequency at an integer multiple of an imaging cycle (frame rate) has been described. However, the accuracy of flicker detection can drop even if the flicker frequency is not the same as an integer multiple of the imaging cycle. Suppose, for example, that flicker changes in light amount at a frequency near an integer multiple of the imaging cycle in obtaining images for flicker detection. Such flicker sometimes takes time to be detected or is unable to be correctly detected since exposure unevenness and other effects on the images are small.

In the present embodiment, to effectively detect flicker that can occur under an LED light source in a wide range of frequencies, the number n of imaging cycles (frame rates) used during flicker detection is adjusted to satisfy a condition that "n≥3 (n is a natural number)". In other words, the flicker detection is performed at n imaging cycles, where n is a natural number of 3 or more.

The higher the light amount change frequency of flicker to be detected, the more accurately the light amount change frequency of the flicker can be detected by increasing the number n of imaging cycles to be used for flicker detection. However, increasing the number of imaging cycles to be used for flicker detection can increase the duration of the flicker detection, causing issues of a release time lag and a drop in the display frame rate of the live view image. In the present embodiment, the number n of imaging cycles to be used for flicker detection is set to 3 as the number of samples enabling effective detection of flicker that can occur under light sources considered to be often used like an LED light source.

Next, a method of selecting specific numerical values of the respective n imaging cycles will be described.

In the present embodiment, a reference imaging cycle is initially set. For example, a reference imaging cycle is assumed to be 100 fps. Light amount change frequencies of flicker synchronous with the imaging cycle of 100 fps are integer multiples of 100 Hz. Flicker occurring at such light amount change frequencies are unable to be correctly detected.

If images are sampled at an imaging cycle of 200 fps that is twice the reference imaging cycle of 100 fps, the same issue as during sampling at the reference imaging cycle of 100 fps occurs. In other words, if an integer multiple of the imaging cycle for sampling images for flicker detection and an integer multiple of the light amount change frequency of flicker are the same, the flicker is unable to be correctly detected based on the sampled images because of synchronization between the imaging cycle and the light amount change frequency.

In the present embodiment, the n (in the present embodiment, n=3) imaging cycles are set so that the remaining (n−1) imaging cycles (in the present embodiment, two) fall between the reference imaging cycle and an imaging cycle that is the immediate integer multiple of the reference imaging cycle. Take, for example, the case of detecting flicker at three imaging cycles with a reference imaging cycle of 100 fps. In such a case, the plurality of imaging cycles for flicker detection is set so that the remaining imaging cycles other than the reference imaging cycle of 100 fps fall are from 100 fps to 200 fps. In the present embodiment, the imaging cycles (frequencies) are set so that the least common multiple of the n imaging cycles is greater than or equal to a predetermined frequency. For example, the imaging cycles (frequencies) are set so that the least common multiple of the n imaging cycles (frame rates) is greater than or equal to a predetermined frequency of 10000 Hz, since LED light sources typically have a blinking frequency of 10000 Hz or less. Moreover, in order for the camera main body 100 to be able to reduce the effect of flicker, the imaging cycles (frequencies) are set so that the least common multiple of the n imaging cycles is greater than a predetermined frequency that is the reciprocal of the highest settable shutter speed of the camera main body 100. With such a configuration, the camera main body 100 can effectively detect flicker occurring under a light source that changes in light amount at a high frequency (for example, 200 Hz or more) like an LED light source, and reduce the effect of the detected flicker by adjusting the shutter speed.

FIGS. 5A and 5B are diagrams illustrating a method of selecting a plurality of imaging cycles in detecting flicker according to the first embodiment of the present invention as an example. To accurately detect the light amount change frequency of flicker, the imaging cycles are set to values far from each other as much as possible so that one of the imaging cycles and the light amount change frequency of the flicker to be detected (blinking cycle of the light source) can have a difference that enables favorable flicker detection. In the present embodiment, as illustrated in FIG. 5A, flicker is detected at imaging cycles set to be separated in steps of 2 to the one-third power so that the range of imaging cycles for detection (100 fps to 200 fps) is divided at predetermined intervals.

Specifically, in the present embodiment, as illustrated in FIG. 5A, the three imaging cycles are: the reference imaging cycle of 100 fps; 100 fps×$2^{(1/3)}$=125.99 fps≈126 fps; and 100 fps×$2^{(2/3)}$=158.74 fps≈159 fps. The three imaging cycles are different in steps of $2^{(1/3)}$=1.2599≈1.26 times, or approximately 26%. With such a configuration, even in a case where a wide frequency range of 50 to 1000 Hz or more is divided into a plurality of ranges for flicker detection, the ranges do not deviate greatly from the detection target frequencies. One of the imaging cycles has a sufficiently large difference from the light amount change frequency of flicker to be detected. In other words, in setting n imaging cycles and detecting flicker at each of the imaging cycles, a drop in detection accuracy at each detection target frequency can be prevented by setting the imaging cycles in steps of 2 to the one-nth power.

FIG. 5B is a diagram illustrating the correspondence of the light amount change frequencies of flicker to be detected with the n imaging cycles as an example. In the present embodiment, flicker is detected based on images obtained at one of the n imaging cycles that corresponds to the farthest frequency from the light amount change frequency of the flicker to be detected. Specifically, in the present embodiment, flicker is detected based on data table illustrated in FIG. 5B, where light amount change frequencies of flicker from 50 Hz to 1008 Hz are divided into ranges (A) to (P) for the three imaging cycles illustrated in FIG. 5A.

In the present embodiment, the effect of flicker is reduced by capturing images of the object at a shutter speed that is the reciprocal of the light amount change frequency of the flicker and setting an imaging period synchronous with the light amount change frequency of the flicker. If there is a deviation between the ideal shutter speed synchronous with the light amount change frequency of the flicker and the actual shutter speed, the effect of the flicker (such as exposure unevenness) on the images becomes more significant when the actual shutter speed is low than when the actual shutter speed is high. Suppose, for example, that shutter speeds of $\frac{1}{101}$ sec and $\frac{1}{1001}$ sec are set for flicker having a light amount change frequency of 100 Hz and 1000 Hz, respectively, with a deviation as much as 1 Hz from the respective ideal shutter speeds for reducing the effect of the flicker. In either case, the deviation between the ideal shutter speed that can reduce the effect of the flicker and the actual shutter speed is as much as 1 Hz, whereas the deviation is equivalent to 1% of the shutter speed of $\frac{1}{100}$ sec and 0.1% of the shutter speed of $\frac{1}{1000}$ sec. In other words, the higher the shutter speed, the smaller the effect of the flicker on the images with respect to a change of 1 Hz in the shutter speed. Meanwhile, a low shutter speed increases the period for which flicker-based changes in light amount are captured, and thus images with smoothened changes in light amount are more likely to be obtained. The detection ranges of the flicker at low frequencies may therefore be adjusted to be wider as appropriate if the flicker to be detected has a light amount change frequency such that the flicker is reduced at shutter speeds of a predetermined value or less (for example, as long as $\frac{1}{25}$ sec or longer).

In the present embodiment, as illustrated in FIG. 5B, detection target ranges are set so that the range of light amount change frequencies of flicker to be detected is divided into a plurality of ranges and the frequencies of these successive ranges vary in steps of $2^{(1/3)}=1.26$ times. For example, the range (N) illustrated in FIG. 5B is a detection target range intended to detect flicker from 159 to 200 Hz, and the next range (C) is from 200 to 252 Hz that are approximately 1.26 times the frequencies of the range (N).

As illustrated in FIG. 5B, adjoining ones of the ranges of the light amount change frequencies of flicker to be detected at the same imaging cycle differ by approximately twice. For example, the ranges (A), (B), and (C) illustrated in FIG. 5B that correspond to the imaging cycle of 159 fps have detection target frequencies of 50 Hz to 63 Hz, 100 Hz to 126 Hz, and 200 Hz to 252 Hz, respectively. The reason is to take into account the fact that changes in light amount due to flicker at integer multiples of frequency are the same. With such a configuration, the image capturing apparatus according to the present embodiment can detect flicker over a wide range of frequencies with stable accuracy.

In the present embodiment, the imaging cycles in detecting flicker are described to differ by m to the one-nth power (m and n are natural numbers). In the foregoing description, m is two (m=2). However, this is not restrictive. For example, the imaging cycles may be set with m=3. In such a case, differences between the imaging cycles are greater, and the detection accuracy with respect to the light amount change frequency of flicker to be detected can be lower than with m=2. However, compared to the case where m=2, the imaging cycles set with m=3 can reduce detection time if the range of detection target frequencies is the same. Such a setting is thus suitable in the case of detecting flicker over a wider range of light amount change frequencies.

Figures 6A, 6B:
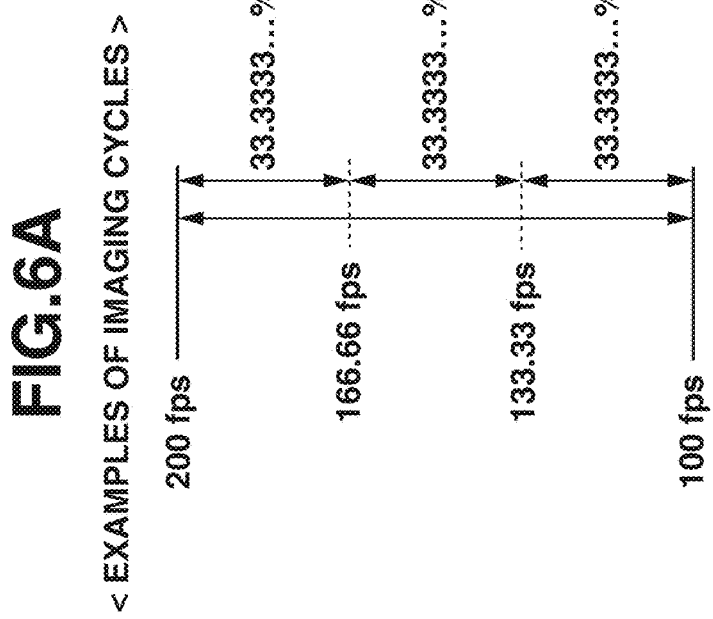
FIGS. 6A and 6B are diagrams illustrating a modification of the method for selecting a plurality of imaging cycles in detecting flicker according to the first embodiment of the present invention as an example.

Now, a different method (modification) of selecting n imaging cycles than the foregoing will be described with reference to FIGS. 6A and 6B. FIGS. 6A and 6B are diagrams illustrating the modification of the method of selecting a plurality of imaging cycles in detecting flicker according to the first embodiment of the present invention as an example. A difference from this modification and the foregoing example described with reference to FIGS. 5A and 5B lies in the method of setting n imaging cycles in the range of imaging cycles for detection.

In this modification, as illustrated in FIG. 6A, the range of imaging cycles for detection is equally divided to set a plurality of imaging cycles. More specifically, with the range of imaging cycles for flicker detection (100 fps to 200 fps) as 100%, n imaging cycles are set to include imaging cycles 33% and 66% different from the reference imaging cycle of 100 fps. Specifically, the three imaging cycles are: the reference imaging cycle of 100 fps; 100 fps×1.333=133.33 fps≈133 fps; and 100 fps×1.666=166.66 fps≈167 fps.

Differences between the foregoing three imaging cycles are 133.33/100=1.3333, 166.66/133.33=1.25, and 200/166.66=1.2. The imaging cycles are thus 20% or more different from each other.

FIG. 6B is a diagram illustrating the correspondence of the light amount change frequencies of flicker to be detected with the n imaging cycles illustrated in FIG. 6A as an example. As illustrated in FIG. 6B, in this modification, flicker is also detected based on images obtained at one of the n imaging cycles that corresponds to the farthest frequency from the light amount change frequency of the flicker to be detected as in FIG. 5B described above.

Differences between the imaging cycles for flicker detection will now be described. As described above, there is a relationship such that the greater the number of imaging cycles for flicker detection increases, the smaller the differences between the imaging cycles and the longer the sampling time. To accurately detect flicker in a short time, the differences between the imaging cycles are desirably as large as possible and the number of imaging cycles for sampling as small as possible within an extent where a wide range of light amount change frequencies of flicker can be detected.

A case where the range between the reference imaging cycle and a cycle twice the reference imaging cycle is divided in steps of 2 to the one-nth power as described with reference to FIGS. 5A and 5B will be described with the range as 100%. In such a case, the imaging cycles for flicker detection vary at intervals expressed by the following Eq. 1:

$$\{2^{(1/n)}-1\} \times 100[\%]. \qquad \text{(Eq. 1)}$$

Now, suppose that the range between the reference imaging cycle and the cycle twice the reference imaging cycle is divided in steps of 100/n [%] as described with reference to FIGS. 6A and 6B, with the range as 100%.

As calculated for n=3, with respect to the imaging cycle different from the reference imaging cycle by 100%×(n−1)/n and the imaging cycle different from the reference imaging cycle by twice, each difference becomes the smallest. The difference is given by the following Eq. 2:

$$[200/\{100 + \{100 \times (n-1)/n\} - 1\} \times 100 \, [\%] = \{200n/(200n - 100) - 1\} \times 100 \, [\%] \quad \text{(Eq. 2)}$$
$$= \{2n/(2n-1) - 1\} \times 100 \, [\%]$$
$$= \{1/(2n-1)\} \times 100 \, [\%].$$

In other words, if the imaging cycles vary in steps of 100/n [%], the imaging cycles (frame rates) used for flicker detection differ from each other at a ratio of {2n/(2n−1)−1}×100% or more. In the camera main body 100 according to the first embodiment of the present invention, the imaging cycles (frame rates) used for flicker detection differ from each other by at least {2n/(2n−1)−1}×100%. This also applies to the foregoing case of dividing the range from the reference imaging cycle to the cycle twice the reference imaging cycle in steps of 2 to the one-nth power with the range as 100%.

FIG. 7 provides a graphic representation of the relationship of the methods of selecting imaging cycles and the number of imaging cycles with differences between the imaging cycles based on the foregoing Eqs. 1 and 2. FIG. 7 is a chart (graph) illustrating the relationship of the methods of selecting imaging cycles for flicker detection according to the present embodiment and the number of imaging cycles with differences between the imaging cycles as an example. As illustrated in FIG. 7, differences between the imaging cycles depending on the number n of imaging cycles are smaller in Eq. 2 illustrated by a solid line than in Eq. 1 illustrated by a broken line. Such a condition also applies to even greater numbers n of imaging cycles not illustrated in FIG. 7. In other words, while two different methods for selecting imaging cycles have been described above, it can be seen that differences between the imaging cycles are greater than or equal to the values given by Eq. 2 regardless of which method is used.

Next, details of the processing for analyzing (detecting) the occurrence of flicker at a plurality of different frequencies in the foregoing step S405 will be described. The image capturing apparatus according to the present embodiment extracts changes in luminance over time based on the luminance of successively obtained images, and analyzes the periodicity of the changes in luminance to detect the light amount change frequency of flicker. The change in luminance in the images differ depending on the method for obtaining the images to be used for detection. For example, when images of an object are captured by a global shutter method using a CCD sensor and when the images are captured by a rolling shutter methods using a CMOS sensor, the change in luminance in the images differ between the cases. The ways the luminance changes when the images are obtained by the respective methods described above will be described below.

A change in the luminance of images obtained by the global shutter method will initially be described with reference to FIG. 8. FIG. 8 is a diagram illustrating a change in luminance based on images successively obtained by the global shutter method as an example. If an image of an object affected by the blinking of a light source due to flicker is captured, a captured image affected by the intensity of the blinking of the light source is obtained. Measuring the luminance of the entire captured image provides a photometric value affected by the intensity of the blinking of the light source.

As employed herein, the luminance may refer to a luminance signal calculated by multiplying R, G1, G2, and B color signals in a raw image of Bayer arrangement by specific coefficients, or the R, G1, G2, and B color signals themselves. A color signal or luminance signal obtained from a sensor array of other than the Bayer arrangement may be used.

Differences or ratios in luminance (photometric value) between successively captured images obtained by the foregoing method are then calculated. Alternatively, an average image of a plurality of images is set as a reference image, and differences or ratios in the luminance of the respective images with respect to the reference image may be calculated. By plotting changes in the luminance of the images obtained by such a method, transition of the changes in the luminance of the images as illustrated in FIG. 8 can be detected.

Figure 9:
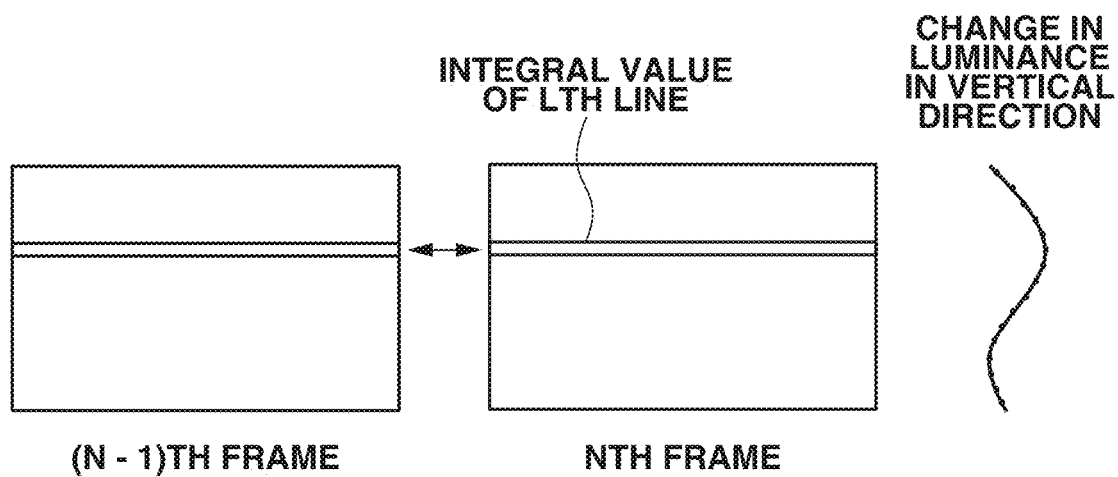
FIG. 9 is a diagram illustrating a change in luminance based on images successively obtained by a rolling shutter method as an example.

Next, a change in luminance of images obtained by the rolling shutter method will be described with reference to FIG. 9. FIG. 9 is a diagram illustrating a change in luminance based on images successively obtained by the rolling shutter method as an example. If a sensor is driven by the rolling shutter method, exposure and reading timing varies from one sensor line to another. The effect of the blinking of the light source due to flicker thus varies line by line, and changes in luminance occur differently in the vertical direction of the image.

If the sensor (in the present embodiment, image sensor 101) is driven by the rolling shutter method, changes in luminance due to the blinking of the light source can thus be extracted by obtaining integral values of the captured images line by line. Specifically, as illustrated in FIG. 9, changes in the luminance of the same lines in successive (N−1)th and Nth frames images obtained by successively capturing images of the object are extracted. Here, the integral values of the captured images corresponding to the Nth and (N−1)th frames are calculated line by line. As described above regarding the global shutter method, the integrated values may be those of luminance signals obtained by multiplying the color signals by specific coefficients, or the integral values of the color signals themselves. The integral values of the Nth frame and those of the (N−1)th frame are compared line by line to calculate differences or ratios. Changes in luminance in the vertical direction of the captured images (i.e., in the scanning direction of the sensor) as illustrated in FIG. 9 can thereby be detected.

The frames to be compared do not need to be two successive ones. For example, an average image may be obtained by averaging the signal values of a plurality of captured images, and the average image is set as a reference image. Changes in luminance in the vertical direction of the images may be calculated by comparing the integral values of the respective lines of the reference image with those of the respective lines of the Nth frame.

By analyzing the captured images obtained by the rolling shutter method in the foregoing manner, transition of the changes in luminance in the vertical direction of the captured images as described above can be detected. The changes in luminance represent the blinking of the light source (i.e., changes in the light amount of the flicker).

Next, a technique for analyzing the frequency of changes in luminance from the transition of changes in the luminance of the images will be described. Among typical techniques for converting a signal changing in a temporal direction into frequency components, one is a Fourier transform. Here, a signal f(t) changing in a temporal direction is converted into a frequency-based function F(ω).

$$F(\omega)=\int_{-\infty}^{\infty} f(t)e^{-i\omega t}dt. \quad (Eq. 3)$$

Focus attention on the exponential function in Eq. 3. Exponential functions are known to be expandable into trigonometric functions representing the real part and the imaginary part based on a relationship between Maclaurin expansion and nth derivatives of the trigonometric functions (see the following Eq. 4):

$$F(\omega)=\int f(t)\cdot\cos(\omega t)dt+j\times(-1)\times\int f(t)\cdot\sin(\omega t)dt. \quad (Eq. 4)$$

Since an integration can be performed assuming that f(t) is the transition of changes in the image signals and dt is the sampling interval of the transition of changes, Eq. 4 can be expressed by the following Eq. (5):

$$F(\omega)=A(\omega)+j\times B(\omega). \quad (Eq. 5)$$

This is a complex function of a frequency ω so that the magnitude thereof is calculated as |F(ω)|. |F(ω)| has a large value if luminance change components of the frequency ω are included in the transition of changes in the luminance of the images. |F(ω)| has a small value if luminance change components of the frequency ω are not included in the transition of changes in the luminance of the images. In other words, |F(ω)| can be regarded as a flicker level with respect to each frequency. The presence or absence of changes in luminance due to the blinking of the light source (i.e., the light amount change frequency of flicker) can thus be detected in a wide range of frequencies by calculating frequency components over a wide range of frequencies targeted for detection, using the foregoing Eq. 5.

The transition of changes in luminance does not cover one or more periods of the blinking of the light source (one or more periods of a change in the light amount of the flicker), the target frequency is unable to be favorably detected but erroneously detected as another frequency. It is therefore desirable to continue capturing images of the object for one or more periods of the target frequency, and detect the foregoing frequencies (i.e., the light amount change frequency of flicker) based on the captured images.

Next, the exposure operation during flicker detection in foregoing step S403 will be specifically described. As described above, if the imaging cycle in detecting flicker is synchronous with the blinking frequency of the light source (the light amount change frequency of the flicker), the flicker is difficult to effectively detect based on the sampled images. Aside from the imaging cycle, flicker is also difficult to detect if the exposure time in capturing the object (i.e., shutter speed) is synchronous with the blinking frequency of the light source, since the images obtained in such a state do not produce effective changes in luminance.

In the present embodiment, the exposure time (shutter speed) is thus set to be synchronous with the imaging cycle in performing the flicker detection operation so that the exposure time will not be synchronous with a frequency other than the imaging cycle. Specifically, in detecting flicker, images of the object are desirably captured at an exposure time (shutter speed) 1/N (N is an integer) of the imaging cycle (frame rate) for detection.

FIG. 10 is a diagram illustrating the setting values of the exposure time (shutter speed) for a first pattern of a plurality of imaging cycles for flicker detection according to the first embodiment of the present invention as an example. If, for example, the plurality of imaging cycles for flicker detection is 100 fps, 126 fps, and 159 fps as described above, images of the object are captured by setting the exposure time as illustrated in FIG. 10.

FIG. 11 is a diagram illustrating the setting values of the exposure time (shutter speed) for a second pattern of the plurality of imaging cycles for flicker detection according to the first embodiment of the present invention as an example. If, for example, the plurality of imaging cycles for flicker detection is 100 fps, 133 fps, and 167 fps as described above, images of the object are captured by setting the exposure time as illustrated in FIG. 11.

As illustrated in FIGS. 10 and 11, images for flicker detection are obtained at exposure times 1/N (N is an integer) of the reciprocals of the imaging cycles (frame rates) for flicker detection. This can prevent synchronization between the exposure times and the light amount change frequency of the flicker.

If the exposure condition varies depending on the light amount change frequency of flicker, the detected flicker levels differ from each other, thereby reducing the detection accuracy. In the present embodiment, the exposure operation is thus performed at the foregoing plurality of imaging cycles based on the result of the light measurement in step S401. This can reduce variations in the exposure amount from one exposure cycle to another, and enables stable detection of flicker levels.

With such a configuration, the image capturing apparatus according to the present embodiment can stably and effectively detect flicker over a wide range of frequencies that can be the light amount change frequency of flicker.

Next, details of the flicker reduction exposure time determination processing performed in the foregoing step S304 will be described with reference to FIG. 12. FIG. 12 is a flowchart related to the flicker reduction exposure time determination processing according to the first embodiment of the present invention. In step S1201, the CPU 103 initially reads the light amount change frequency of the flicker detected by the flicker detection processing performed in the foregoing step S302 from the RAM.

In step S1202, the CPU 103 calculates an ideal exposure time (ideal flicker reduction exposure time) IdealFlkExpTime for reducing the effect of the detected flicker based on the reciprocal of the light amount change of the flicker read in step S1201. For example, if the light amount change frequency of the detected flicker is 540.0 Hz, IdealFlkExpTime=1/540.0. The shutter speed that is the reciprocal of the light amount change frequency of the detected flicker is a shutter speed that most significantly reduces the effect of the detected flicker.

In step S1203, the CPU 103 obtains a currently set shutter speed (current shutter speed) CurTv. An example of the current shutter speed CurTv is the shutter speed set by the user's manual operation. In the present embodiment, suppose that the imaging mode of the camera main body 100 is set to a manual mode in advance, and a plurality of exposure control values (parameters) is all manually set by the user.

In step S1204, the CPU 103 performs initialization processing for integer multiplication of the ideal flicker reduction exposure time IdealFlkExpTime. Specifically, in step S1204, the CPU 103 sets an integer N=1, and stores information about the ideal flicker reduction exposure time IdealFlkExpTime before integer multiplication as previously set ideal flicker reduction exposure time PreIdealFlkExpTime.

In step S1205, the CPU 103 compares the currently set shutter speed CurTv obtained in step S1203 with the ideal flicker reduction exposure time IdealFlkExpTime. If the value of CurTv is less than or equal to that of IdealFlkExpTime (i.e., the exposure time is shorter) (YES in step S1205), the processing proceeds to step S1207. On the other hand, if the value of CurTv is greater than that of IdealFlkExpTime (the exposure time is longer) (NO in step S1205), the processing proceeds to step S1206.

In step S1206, the CPU 103 stores the current ideal flicker reduction exposure time IdealFlkExpTime as the previously set ideal flicker reduction exposure time PreIdealFlkExpTime, increments the integer N by one, and multiplies the ideal flicker reduction exposure time IdealFlkExpTime by the integer N. Specifically, in step S1206, the CPU 103 substitutes IdealFlkExpTime into PreIdealFlkExpTime, increments N to N+1, and multiplies IdealFlkExpTime by the integer N. The processing of step S1206 (ideal flicker reduction exposure time integer multiplication processing) is repeated until the currently set shutter speed becomes less than or equal to the ideal flicker reduction exposure time (CurTv≤IdealFlkExpTime) in step S1205. In other words, the processing of step S1206 is processing for bringing the ideal flicker reduction exposure time IdealFlkExpTime as close to the currently set shutter speed CurTv as possible. By such processing, the exposure time for reducing flicker can be narrowed down to exposure times close to the user-set shutter speed, for example, since CurTv falls between IdealFlkExpTime and PreIdealFlkExpTime.

In step S1207, the CPU 103 compares the absolute value of a difference between IdealFlkExpTime and CurTv with the absolute value of a difference between PreIdealFlkExpTime and CurTv. If the absolute value of the difference between IdealFlkExpTime and CurTv is less than or equal to the absolute value of the difference between PreIdealFlkExpTime and CurTv (NO in step S1207), this flicker reduction exposure time determination processing ends. The reason is that the value of the currently set ideal flicker reduction exposure time IdealFlkExpTime can be determined to be closer to the current shutter speed CurTv than the value of PreIdealFlkExpTime is.

On the other hand, if the absolute value of the difference between IdealFlkExpTime and CurTv is greater than the absolute value of the difference between PreIdealFlkExpTime and CurTv (YES in step S1207), the processing proceeds to step S1208. The reason is that the previously set ideal flicker reduction exposure time PreIdealFlkExpTime can be determined to be closer to the current shutter speed CurTv than the currently set ideal flicker reduction exposure time IdealFlkExpTime is. In step S1208, the CPU 103 substitutes the previously set ideal flicker reduction exposure time PreIdealFlkExpTime into the ideal flicker reduction exposure time IdealFlkExpTime. This flicker reduction exposure time determination processing ends.

By the flicker reduction exposure time determination processing according to the present embodiment described above, the exposure time (shutter speed) for reducing flicker can be determined to be a value close to the user-set shutter speed, for example. With such a configuration, images with reduced flicker effect can be obtained while reducing differences from the intended imaging effect due to the user adjusting the shutter speed, for example.

FIGS. 13A and 13B are diagrams illustrating a method for setting the ideal flicker reduction exposure time IdealFlkExpTime in the presence of flicker changing in light amount at a predetermined light amount change frequency according to the present embodiment as an example. FIG. 13A illustrates an example where the shutter speed is set to 1/5792.6 sec (CurTv=1/5792.6) by the user. FIG. 13B illustrates an example where the shutter speed is set to 1/250.5 sec (CurTv=1/250.5) by the user.

Suppose, for example, that the light amount change frequency of the detected flicker is 540.0 Hz. In the example illustrated in FIG. 13A, the ideal flicker reduction exposure time IdealFlkExpTime is 1/540.0. In the example of FIG. 13B, the ideal flicker reduction exposure time IdealFlkExpTime is 1/270.0 at the same flicker light amount change frequency. Changes in the light amount of the flicker at integer multiple frequencies are the same. The effect of the flicker can thus be reduced as well if images of the object are captured at a shutter speed that is lower than the reciprocal of the light amount change frequency of the flicker and is the reciprocal of an integer multiple of the flicker frequency. If the user-set shutter speed is lower than or equal to the reciprocal of the light amount change frequency of the detected flicker, a value having a smallest difference from the user-set shutter speed among the reciprocals of integer multiples of the flicker frequency can thus be determined to be the ideal flicker reduction exposure time IdealFlkExpTime. With such a configuration, a shutter speed that most significantly reduces the effect of the detected flicker can be set while making a deviation from the user-intended shutter speed as small as possible.

Figure 14:
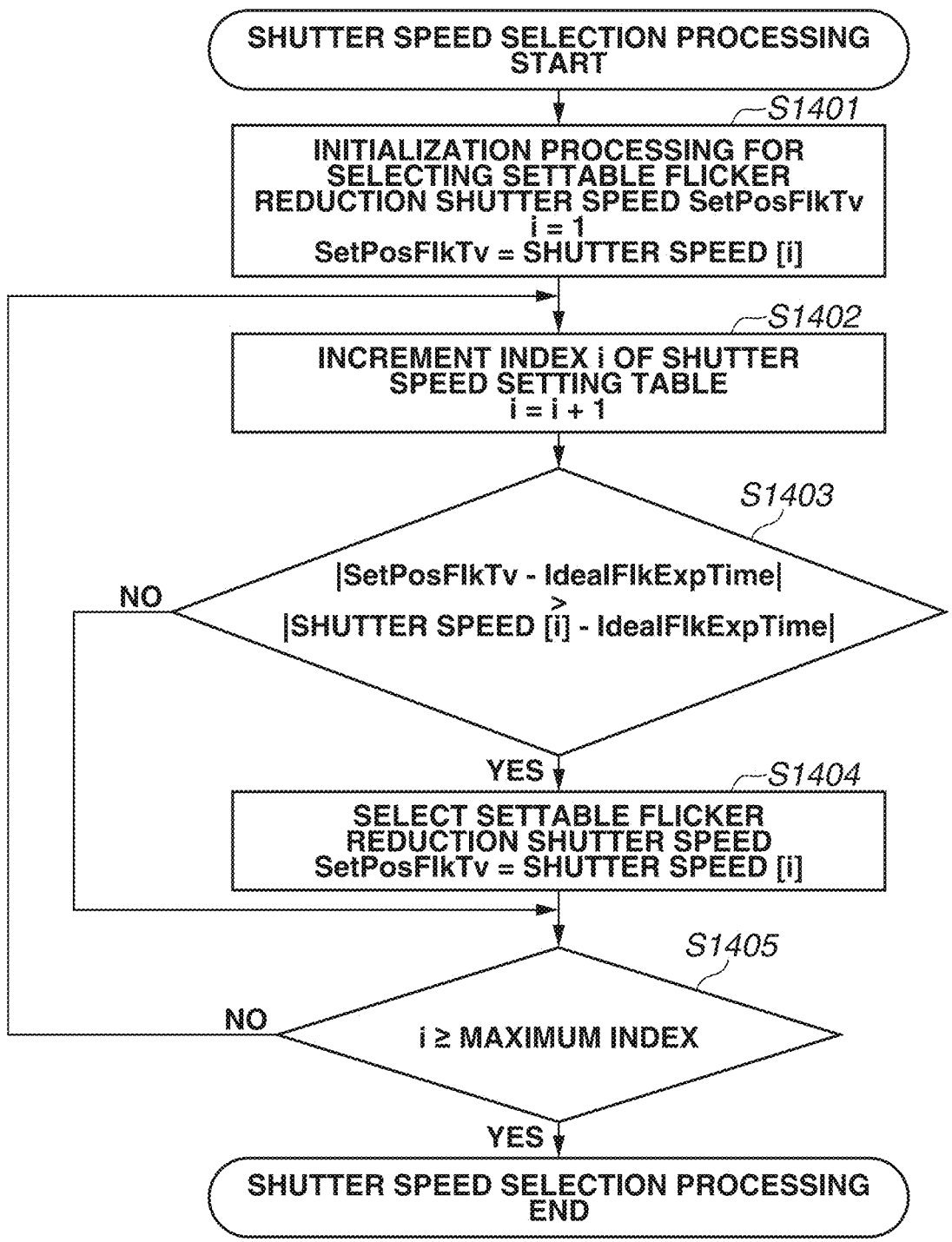
FIG. 14 is a flowchart related to shutter speed selection processing according to the first embodiment of the present invention.

Next, details of the shutter speed selection processing performed in the foregoing step S305 will be described with reference to FIG. 14. FIG. 14 is a flowchart related to the shutter speed selection processing according to the first embodiment of the present invention. In step S1401, the CPU 103 initially performs initialization processing for selecting a shutter speed from the shutter speed setting (index) table described above with reference to FIG. 2. Specifically, in step S1401, the CPU 103 sets a settable flicker reduction shutter speed SetPosFlkTv based on the shutter speed setting table, with an index i=1. In the present embodiment, as illustrated in FIG. 2, the settable flicker reduction shutter speed SetPosFlkTv for the index i=1 is 1/8192.0 sec.

In step S1402, the CPU 103 increment the index i of the shutter speed setting table by one. In step S1403, the CPU 103 compares the absolute value of a difference between SetPosFlkTv and the foregoing ideal flicker reduction exposure time IdealFlkExpTime with the absolute value of a difference between the shutter speed corresponding to the index i (hereinafter, referred to as shutter speed [i]) in the shutter speed setting table and the ideal flicker reduction exposure time IdealFlkExpTime. If the absolute value of the difference between SetPosFlkTv and IdealFlkExpTime is less than or equal to the absolute value of the difference between the shutter speed [i] and IdealFlkExpTime (NO in step S1403), the processing proceeds to step S1405.

On the other hand, if the absolute value of the difference between SetPosFlkTv and IdealFlkExpTime is determined to be greater than the absolute value of the difference between the shutter speed [i] and IdealFlkExpTime (YES in step S1403), the processing proceeds to step S1404. In step S1404, the CPU 103 selects the settable flicker reduction shutter speed SetPosFlkTv based on the result of the determination made in step S1403. Specifically, in step S1404, the CPU 103 sets the settable flicker reduction shutter speed SetPosFlkTv to the shutter speed [i] corresponding to the current index i of the shutter speed setting table. The processing proceeds to step S1405.

In step S1405, the CPU 103 determines whether the index i of the shutter speed setting table is greater than or equal to a maximum index. If the current index i is less than the maximum index (NO in step S1405), the processing returns to step S1402. The CPU 103 then repeats the processing of steps S1402 to S1405. In the present embodiment, the maximum index is 600 as illustrated in FIG. 2. If, in step S1405, the current index i is determined to have reached the maximum index (YES in step S1405), the current SetPosFlkTv is selected as the settable flicker reduction shutter speed, and the shutter speed selection processing ends.

In the foregoing example, the shutter speed selection processing is performed for all the indexes that can be referred to in the shutter speed setting table. However, this is not restrictive. For example, if the currently set shutter speed CurTv is obtained by the flicker reduction exposure time determination processing, the settable flicker reduction shutter speed SetPosFlkTv may be determined from the vicinity of the currently set shutter speed CurTv. Specifically, if a specific value is recorded as the currently set shutter speed CurTv, the CPU 103 identifies the index corresponding to a shutter speed closest to CurTv. The CPU 103 can then determine differences of the shutter speed corresponding to the index and the shutter speeds corresponding to other indexes adjoining to the index from the ideal flicker reduction exposure time IdealFlkExpTime, and determine the shutter speed that minimizes the difference as the settable flicker reduction shutter speed SetPosFlkTv. This configuration is particularly effective in a case where a specific shutter speed is set by the user. The use of such a configuration can reduce processing time and processing load related to the shutter speed selection processing since deviations from the user-intended shutter speed are small and the indexes to be compared are significantly reduced.

By performing the foregoing shutter speed selection processing, a shutter speed that can effectively reduce the effect of the flicker detected in advance can be selected from among the settable shutter speeds of the camera main body 100. In other words, the camera main body 100 according to the present embodiment can select (set) one of the settable shutter speeds that is closest to the ideal shutter speed IdealFlkExpTime for reducing the effect of the detected flicker.

FIGS. 15A and 15B are diagrams illustrating a relative relationship between the shutter speed selected by the shutter speed selection processing according to the first embodiment of the present invention and the ideal shutter speed for reducing the effect of flicker as an example. In FIGS. 15A and 15B, the light amount change frequency of the flicker is assumed to be 540.0 Hz, and the ideal flicker reduction exposure time IdealFlkExpTime 1/540.0. FIG. 15A illustrates a case where the shutter speed CurTv currently set by the user is 1/5792.6. FIG. 15B illustrates a case where the shutter speed CurTv currently set by the user is 1/250.5.

In FIG. 15A, a difference between Tv=1/546.4 indicated by an index of 58 in the shutter speed setting table and Tv=1/540.0 that is IdealFlkExpTime is denoted by Δ58. In FIG. 15A, a difference between Tv=1/534.7 indicated by an index of 59 in the shutter speed setting table and Tv=1/540.0 that is IdealFlkExpTime is denoted by Δ59. In the case illustrated in FIG. 15A, Tv=1/534.7 is selected as SetPosFlkTv by the foregoing shutter speed selection processing since Δ59<Δ58.

In FIG. 15B, a difference between Tv=1/273.2 indicated by an index of 119 in the shutter speed setting table and Tv=1/270.0 that is IdealFlkExpTime is denoted by Δ119. In FIG. 15B, a difference between Tv=1/270.2 indicated by an index of 120 in the shutter speed setting table and Tv=1/270.0 that is IdealFlkExpTime is denoted by Δ120. In the case illustrated in FIG. 15B, Tv=1/270.2 is selected as SetPosFlkTv by the foregoing shutter speed selection processing since Δ120<Δ119.

As described above, the camera main body 100 according to the present embodiment can effectively detect the light amount change frequency of flicker occurring in the current imaging environment and the ideal shutter speed (exposure time) for reducing the effect of the detected flicker in as short a time as possible.

The camera main body 100 according to the present embodiment can set, as the ideal shutter speed for reducing the effect of the flicker, a shutter speed with the shutter speed currently set by the user taken into account. The camera main body 100 according to the present embodiment can thus detect the shutter speed that can reduce the effect of the flicker while preventing a change from the user-intended exposure condition and imaging effect as much as possible.

Moreover, the camera main body 100 according to the present embodiment can automatically select (set) a shutter speed closest to the ideal shutter speed that can reduce the effect of the flicker from among the settable shutter speeds of the camera main body 100. The camera main body 100 according to the present embodiment can thus automatically select (set) a shutter speed that can reduce the effect of the flicker without a need for the user to manually adjust the shutter speed.

Figure 16A:
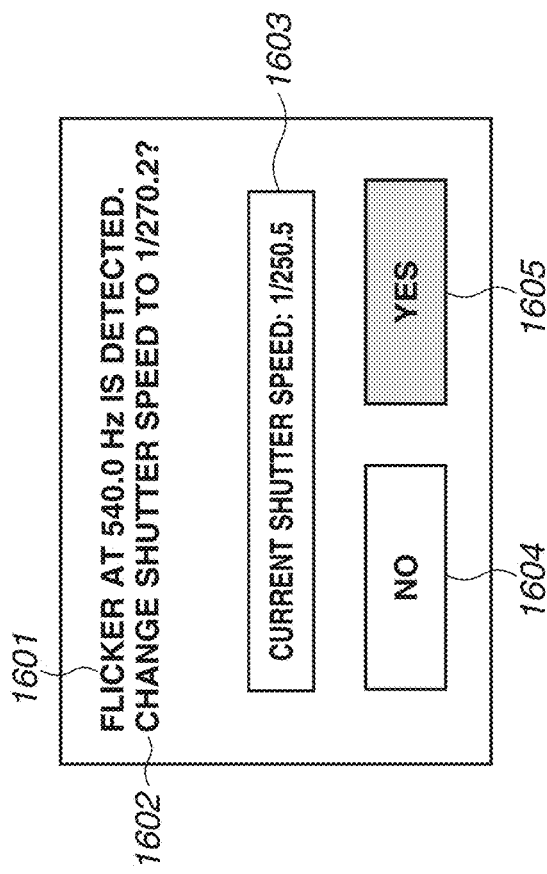
FIGS. 16A and 16B are diagrams illustrating a notification screen displayed on a display unit by display processing according to the first embodiment of the present invention as an example.
Figure 16B:
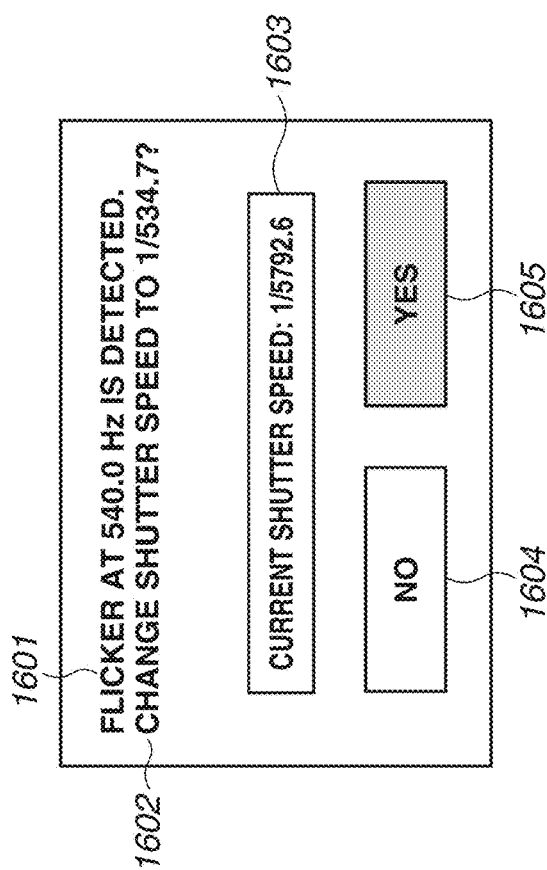

Next, details of the display processing in the foregoing step S306 according to the first embodiment of the present invention will be described with reference to FIGS. 16A, 16B, and 17. FIGS. 16A and 16B are diagrams illustrating a notification screen displayed on the display unit 102 by the display processing according to the first embodiment of the present invention as an example.

FIG. 16A illustrates a case where flicker at 540.0 Hz is detected, CurTv is 1/5792.6, and SetPosFlkTv is 1/534.7. FIG. 16B illustrates a case where flicker at 540.0 Hz is detected, CurTv is 1/250.5, and SetPosFlkTv is 1/270.2. FIG. 17 is a diagram illustrating a notification screen displayed by the display processing according to the first embodiment of the present invention in a case where no flicker is detected.

A detected flicker area 1601 displays information indicating the light amount change frequency of the flicker detected based on the foregoing method (in the illustrated example, 540.0 Hz).

A selectable shutter speed area 1602 displays the settable flicker reduction shutter speed SetPosFlkTv determined based on the foregoing method (in FIG. 16A, 1/534.7; in FIG. 16B, 1/270.2).

A current shutter speed area 1603 displays the shutter speed of the camera main body 100 currently set by the user's manual setting (in FIG. 16A, 1/5792.6; in FIG. 16B, 1/250.5).

A first user selection icon 1604 displays an option to not consent to change the shutter speed to the settable flicker reduction shutter speed SetPosFlkTv displayed on the notification screen. A second user selection icon 1605 displays an option to consent to change the shutter speed to the settable flicker reduction shutter speed SetPosFlkTv displayed on the notification screen.

Figure 17:
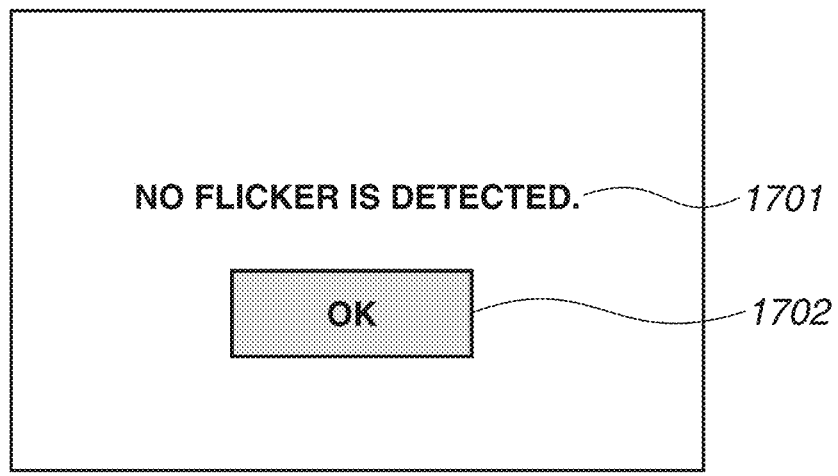
FIG. 17 is a diagram illustrating a notification screen displayed by the display processing according to the first embodiment of the present invention in a case where no flicker is detected as an example.

If no flicker at a predetermined level or more is detected by the flicker detection processing, a message 1701 indicating that no flicker is detected and an icon 1702 by using which the user can make a confirmation input are displayed on the display unit 102 as illustrated in FIG. 17.

As described above, if flicker having a predetermined light amount change frequency is detected by the flicker detection processing, various icons and messages such as illustrated in FIGS. 16A and 16B are displayed on the display unit 102 to prompt the user to change the shutter speed. Such a configuration can facilitate setting a shutter speed that can reduce the effect of the flicker while reducing user's labor of adjusting the shutter speed by a manual operation such that the effect of the flicker can be reduced. The camera main body 100 according to the present embodiment can thus capture images with reduced effect of flicker over a wide range of light amount change frequencies without needing complicated operations and reduce image unevenness due to flicker regardless of light sources.

The method for notifying the user of the light amount change frequency of flicker and the shutter speed that can reduce the effect of the flicker and the method for changing the shutter speed are not limited to the foregoing. In the foregoing example, the notification screen is described to be displayed on the display unit 102. However, the notification screen may be displayed on other display devices or an external device connected to the camera main body 100. The notification method is not limited to image display, either. Various notification units may be used instead to issue a notification using voice guidance, changing the lighting state of a lamp (not illustrated) provided on the camera main body 100, or changing the light color.

The camera main body 100 according to the present embodiment uses the method for inquiring of the user whether to change the shutter speed to the settable flicker reduction shutter speed SetPosFlkTv. However, this is not restrictive. For example, the camera main body 100 may be configured to automatically change the shutter speed to the settable flicker reduction shutter speed SetPosFlkTv without the user's consent. The camera main body 100 may be configured to switch whether to inquire of the user about the change to the settable flicker reduction shutter speed SetPosFlkTv based on the imaging mode.

If the imaging mode is an auto mode where the camera main body 100 automatically determines parameters related to exposure control, the camera main body 100 desirably automatically sets the settable flicker reduction shutter speed SetPosFlkTv. By contrast, if the imaging mode is a manual mode where the user manually sets the parameters (exposure control values) related to exposure control, the method for inquiring of the user whether to change the shutter speed is desirably used as in the foregoing example.

The camera main body 100 according to the present embodiment has been described to use the electronic shutter preferentially. However, this is not restrictive. For example, the camera main body 100 may be configured to control the exposure time of the image sensor 101 based on a given shutter speed using the mechanical shutter 104.

In capturing an image of an object using the mechanical shutter 104 with the shutter speed set high, the running timing of the mechanical shutter 104 can deviate from the ideal exposure time depending on variations in the physical characteristics of the mechanical shutter 104 and environmental differences. In other words, if the shutter speed set as the settable flicker reduction shutter speed SetPosFlkTv is high, the camera main body 100 is sometimes unable to capture an image of the object with the exposure time that can properly reduce the flicker effect.

In the case of adjusting the exposure time using the mechanical shutter 104, the camera main body 100 may therefore be configured to limit the settable flicker reduction shutter speed SetPosFlkTv so that the shutter speed becomes shorter than or equal to a predetermined speed. The predetermined speed (shutter speed) may have a value such that the amount of deviation (i.e., error) between the ideal exposure time and the timing of exposure and light-shielding of the image sensor 101 due to the driving of the mechanical shutter 104 falls within a predetermined range. In the present embodiment, the shutter speed that is the predetermined speed is set to 1/4000 sec as an example. In such a case, the settable flicker reduction shutter speed SetPosFlkTv can be determine using the foregoing shutter speed setting table within the range excluding the indices corresponding to the shutter speed of 1/4000 sec or less, or using new table data.

The camera main body 100 according to the present embodiment may be configured to make a dynamic adjustment regarding whether to use the electronic shutter or the mechanical shutter 104 based on the value of the settable flicker reduction shutter speed SetPosFlkTv. For example, if the shutter speed is higher than 1/4000 sec, only the electronic shutter may be made usable. At other shutter speeds, both the electronic shutter and the mechanical shutter 104 may be made usable.

In the foregoing first embodiment, a description is given of a configuration where only one settable flicker reduction shutter speed SetPosFlkTv is notified to the user. In a second embodiment, a configuration for notifying the user of a plurality of options for the settable flicker reduction shutter speed SetPosFlkTv will be described with reference to FIG. 18. A configuration of a camera main body 100 that is an image capturing apparatus according to the present embodiment, a lens unit 200, and a light emitting device 300, and a basic driving method thereof are similar to those of the foregoing first embodiment. The components will thus be denoted by the same reference numerals, and a description thereof will be omitted. The present embodiment is different from the foregoing first embodiment in the display processing of step S306.

FIGS. 18A and 18B are diagrams each illustrating a notification screen displayed on the display unit 102 by the display processing according to the second embodiment of the present invention as an example. FIG. 18A illustrates a case where flicker at 540.0 Hz is detected, CurTv is 1/5792.6, and SetPosFlkTv is 1/534.7. FIG. 18B illustrates a case where flicker at 540.0 Hz is detected, CurTv is 1/250.5, and SetPosFlkTv is 1/270.2.

A detected flicker area 1801 displays information indicating the light amount change frequency of the flicker detected. A current shutter speed area 1802 displays the shutter speed CurTv of the camera main body 100 that is currently set by the user's manual setting (in FIG. 18A, 1/5792.6; in FIG. 18B, 1/250.5).

A selectable shutter speed first candidate area 1803 displays the settable flicker reduction shutter speed SetPosFlkTv determined based on the method described in the first embodiment as a first candidate shutter speed selectable by the user. FIG. 18A illustrates a case where the selectable shutter speed first candidate area 1803 displays 1/534.7, and FIG. 18B 1/270.2.

A selectable shutter speed second candidate area 1804 displays the shutter speed corresponding to an index at which the difference from IdealFlkExpTime is the second smallest after SetPosFlkTv as a second candidate shutter speed selectable by the user. FIG. 18A illustrates a case where the selectable shutter speed second candidate area 1804 displays 1/546.4, and FIG. 18B 1/273.2.

A selectable shutter speed alternative candidate area 1805 displays a shutter speed, if any, that provides a higher effect of reducing the effect of the flicker regardless of the difference from CurTv as another candidate shutter speed selectable by the user. FIG. 18A illustrates an example where the selectable shutter speed alternative candidate area 1805 displays 1/270.2 that is close to Tv=1/270.0, i.e., twice Tv=1/540.0 that is IdealFlkExpTime. In the case where the flicker at 540.0 Hz is detected, Tv=1/270.2 has a greater difference from CurTv but has a higher effect of reducing the effect of the flicker than SetPosFlkTv (1/534.7).

Shutter speed selection icons 1806 are displayed for the user to select a selectable candidate shutter speed. A white arrow icon indicates the absence of a candidate shutter speed. A black arrow icon indicates the presence of a candidate shutter speed. In FIG. 18A, there is no other SetPosFlkTv candidate for the selectable shutter speed first candidate area 1803, and a white arrow icon is thus displayed beside the selectable shutter speed first candidate area 1803. The same applies to the example illustrated in FIG. 18B. In FIG. 18A, there is another candidate shutter speed (1/180.0) having a high effect of reducing the effect of the flicker for the selectable shutter speed alternative candidate area 1805, and a black arrow icon is thus displayed beside the selectable shutter speed alternative candidate area 1805. In FIG. 18B, there also is another candidate shutter speed (1/135.0) having a high effect of reducing the effect of the flicker for the selectable shutter speed alternative candidate area 1805, and a black arrow icon is thus displayed beside the selectable shutter speed alternative candidate area 1805.

As described above, the camera main body 100 according to the present embodiment can notify the user of a plurality of candidates for the shutter speed that can reduce the effect of flicker, aside from SetPosFlkTv. Such a configuration can facilitate setting a user-desired shutter speed among a plurality of candidates that can reduce the effect of flicker while reducing user's labor of adjusting the shutter speed by a manual operation so that the effect of the flicker can be reduced. The camera main body 100 according to the present embodiment can thus capture images with reduced effect of flicker over a wide range of light amount change frequencies without needing complicated operations and reduce image unevenness due to flicker regardless of light sources.

In the foregoing first embodiment, a description is given of an example where the specific notification screen is displayed on the display unit 102. In a third embodiment, a configuration for performing flicker detection processing during a live view display for successively displaying captured images will be described with reference to FIG. 19. A configuration of a camera main body 100 that is an image capturing apparatus according to the present embodiment, a lens unit 200, and a light emitting device 300, and a basic driving method thereof are similar to those of the foregoing first embodiment. The components will thus be denoted by the same reference numerals, and a description thereof will be omitted.

Figure 19:
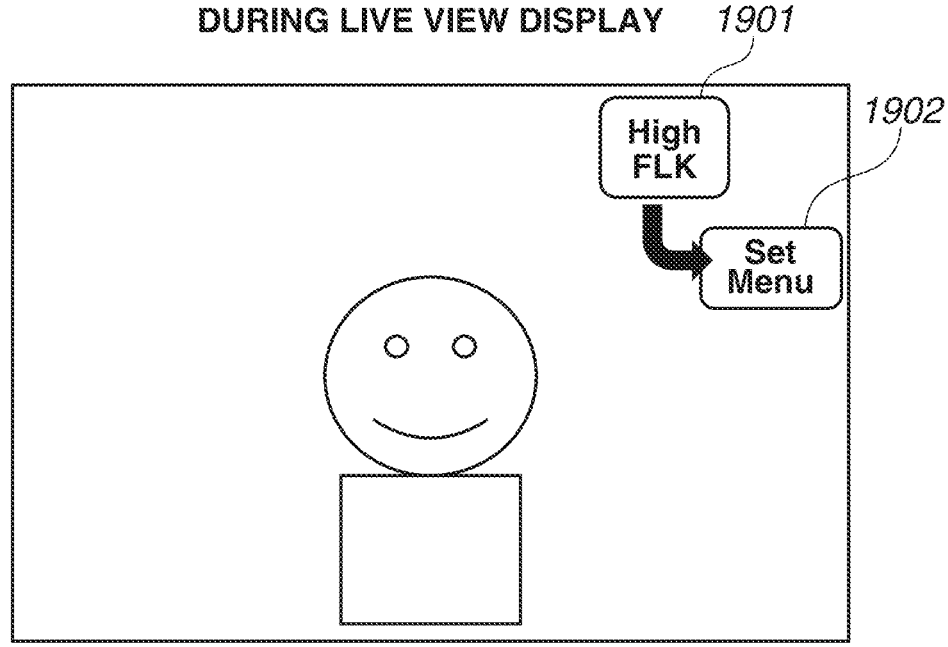
FIG. 19 is a diagram illustrating a screen for transitioning to flicker reduction processing during a live view display according to a third embodiment of the present invention as an example.

FIG. 19 is a diagram illustrating a screen for transitioning to the flicker reduction processing during a live view display according to the third embodiment of the present invention as an example. While the present embodiment deals with a configuration for providing the live view display on the display unit 102, the camera main body 100 may be configured to provide the live view display on a not-illustrated electronic viewfinder. During the live view display, the image sensor 101 performs sampling (charge accumulation) for flicker detection at timing different from the charge accumulation timing for obtaining captured images for use in the live view display.

As illustrated in FIG. 19, a flicker detection icon 1901 is an icon for displaying the detection of flicker when the flicker is detected by the flicker detection processing described above in the foregoing first embodiment. If flicker detection processing different from the foregoing flicker detection processing can be performed, the flicker detection icon 1901 may be used to provide a similar display. Alternatively, the camera main body 100 may be configured to use an icon different from the flicker detection icon 1901 for the purpose. An example of the different flicker detection processing may be processing for detecting specific flicker (100 Hz or 120 Hz) occurring due to a change in the period of the commercial power source.

The flicker detection icon 1901 may be configured to be displayed only when flicker is detected. The flicker detection icon 1901 may be constantly displayed and the display content may be changed (updated) depending on whether flicker is detected. Moreover, the camera main body 100 may be configured so that the CPU 103 controls execution of the flicker detection processing if the flicker detection icon 1901 is pressed by the user.

A flicker reduction menu transition icon 1902 is an icon for causing the display content of the display unit 102 to transition to the notification screen described in the first and second embodiments if the user makes a pressing operation (including a touch operation) on the flicker reduction menu transition icon 1902. In other words, the camera main body 100 according to the present embodiment can transition directly to the notification screen during a live view display without the user going through another user interface such as a menu screen.

As described above, the camera main body 100 according to the present embodiment can implement transition to detection of flicker changing in light amount over a wide range of frequency and capturing of images with reduced effect of the flicker even in a state of capturing images of an object, like during a live view display, using the user's simple operation. Such a configuration can facilitate setting a user-desired shutter speed among a plurality of candidates that can reduce the effect of the flicker while reducing the number of user's manual operations related to the flicker detection. The camera main body 100 according to the present embodiment can thus capture images with reduced effect of flicker over a wide range of light amount change frequencies without needing complicated operations and reduce image unevenness due to flicker regardless of light sources.

In the foregoing first embodiment, the flicker reduction exposure time determination processing performed in a case where the current shutter speed CurTv is set in advance is described. In a fourth embodiment, flicker reduction exposure time determination processing performed in a case where a specific shutter speed (CurTv) is not set by, e.g., the user's manual operations will be described. A configuration of a camera main body 100 that is an image capturing apparatus according to the present embodiment, a lens unit 200, and a light emitting device 300, and a basic driving method thereof are similar to those of the foregoing first embodiment. The components will thus be denoted by the same reference numerals, and a description thereof will be omitted.

Aside from the foregoing auto mode and manual mode, the settable imaging modes of the camera main body 100 include priority modes where the user manually sets an exposure control value and the other exposure control values are automatically set. Among examples of settable priority modes of the camera main body 100 according to the present embodiment is a shutter speed priority mode where the user can manually set the shutter speed.

For example, in an automatic exposure control state where the imaging mode of the camera main body 100 is set to the auto mode, the shutter speed is not freely set by the user. In the flicker reduction exposure time determination processing according to the foregoing first embodiment, determination of the ideal flicker reduction exposure time IdealFlkExpTime in consideration of the current shutter speed CurTv is not particularly needed.

In the present embodiment, the ideal flicker reduction exposure time IdealFlkExpTime is therefore determined based on a result of determination as to whether the current shutter speed CurTv is a shutter speed CurUserTv manually set by the user. Specifically, the CPU 103 of the camera main body 100 according to the present embodiment determines whether CurTv≠CurUserTv. If CurTv≠CurUserTv, the CPU 103 sets a shutter speed that minimizes the difference from the ideal flicker reduction exposure time IdealFlkExpTime in the shutter speed setting table as the settable flicker reduction shutter speed SetPosFlkTv.

If such a configuration is applied to the foregoing flicker reduction exposure time determination processing, processing of step S1203, step S1205, and the subsequent steps is not needed. Here, the ideal flicker reduction exposure time IdealFlkExpTime is set to the exposure time that is the reciprocal of the light amount change frequency of the flicker detected. However, this is not restrictive. For example, as described above in the second embodiment, the camera main body 100 may be configured to set the settable flicker reduction shutter speed SetPosFlkTv so that a difference from the value obtained by multiplying the ideal flicker reduction exposure time IdealFlkExpTime by an integer N is minimized to increase the effect of reducing the flicker effect. In such a case, the CPU 103 repeats the comparison between a shutter speed settable based on the shutter speed setting table and the value of an integer multiple of the ideal flicker reduction exposure time IdealFlkExpTime. The CPU 103 then selects the shutter speed that minimizes the difference as the settable flicker reduction shutter speed SetPosFlkTv.

In the foregoing first and second embodiments assuming that CurTv is set in advance, the value of the settable flicker reduction shutter speed SetPosFlkTv is determined by taking into account differences from CurTv. However, this is not restrictive. For example, the camera main body 100 may compare differences of the reciprocals of the light amount change frequency of the flicker and the integer multiples thereof from a shutter speed corresponding to each index, and set the value that provides the minimum difference as the settable flicker reduction shutter speed SetPosFlkTv. In such a case, a range of light amount change frequencies of flicker that can be reduced by the settable shutter speeds of the camera main body 100 may be defined, and only the reciprocals of frequencies within the range may be compared.

The determination regarding whether CurTv≠CurUserTv in the present embodiment may be made depending on the currently set imaging mode of the camera main body 100.

As described above, the camera main body 100 according to the present embodiment can calculate an optimum shutter speed that can effectively reduce the effect of flicker changing in light amount over a wide range of frequencies even if a specific shutter speed is not set by the user. Such a configuration can facilitate setting a shutter speed that can most effectively reduce the effect of the flicker without needing the user's complicated operations regardless of the imaging condition of the camera main body 100.

The camera main body 100 according to the present embodiment can thus capture images with reduced effect of flicker over a wide range of light amount change frequencies without needing complicated operations and reduce image unevenness due to flicker regardless of light sources.

In the foregoing first embodiment, the flicker reduction processing during imaging of an object in obtaining a still image is described. In a fifth embodiment, flicker reduction processing during imaging of an object in obtaining a moving image will be described. A configuration of a camera main body 100 that is an image capturing apparatus according to the present embodiment, a lens unit 200, and a light emitting device 300, and a basic driving method thereof are similar to those of the foregoing first embodiment. The components will thus be denoted by the same reference numerals, and a description thereof will be omitted.

In the case of obtaining a moving image, settable shutter speeds are limited by the update cycle of the frames constituting the moving image. In other words, some shutter speeds may not be set depending on the recording frame rate of the moving image.

Moreover, some settable shutter speeds are not desirable as a shutter speed in obtaining a moving image. For example, high shutter speed results in a short exposure time in one frame. Since temporal differences between the frames constituting the moving image increase, the motion of the object in the moving image does not look smooth.

In the present embodiment, the flicker reduction processing in obtaining a moving image is thus configured so that a longest exposure time settable at the set frame rate of the moving image is determined to be the ideal flicker reduction exposure time IdealFlkExpTime. In some cases, the ideal flicker reduction exposure time IdealFlkExpTime is not the same as a settable flicker reduction shutter speed. If the settable flicker reduction shutter speed SetPosFlkTv selected based on the newly determined ideal flicker reduction exposure time IdealFlkExpTime has a value not settable at the current frame rate of the moving image, the settable flicker reduction shutter speed SetPosFlkTv is adjusted accordingly. Specifically, the settable flicker reduction shutter speed SetPosFlkTv is set to a shutter speed closest to the newly determined ideal flicker reduction exposure time IdealFlkExpTime among the shutter speeds not limited by the frame rate of the moving image.

In the present embodiment, the processing related to the comparison with CurTv in the foregoing flicker reduction exposure time determination processing can be omitted. However, the camera main body 100 may be configured to use the longest of the integer multiples of the ideal flicker reduction exposure time IdealFlkExpTime of which differences from the current shutter speed CurTv fall within a predetermined time as the final ideal flicker reduction exposure time IdealFlkExpTime.

As described above, even in capturing images of an object to obtain a moving image, the camera main body 100 according to the present embodiment can detect flicker changing in light amount over a wide range of frequencies and capture the images with reduced effect of the flicker while preventing a drop in the quality of the moving image. With such a configuration, the camera main body 100 according to the present embodiment can facilitate setting a shutter speed that can reduce the effect of flicker both in obtaining a still image and in obtaining a moving image without needing the user's additional operation. The camera main body 100 according to the present embodiment can thus capture images with reduced effect of flicker over a wide range of light amount change frequencies without needing complicated operations and reduce image unevenness due to flicker regardless of light sources.

In the foregoing first embodiment, a configuration for setting the ideal flicker reduction exposure time IdealFlk-ExpTime to reduce a difference from the current shutter speed CurTv is described. In a sixth embodiment, a method for setting an ideal flicker reduction exposure time IdealFlk-ExpTime that can reduce the effects of camera shakes and object motion will be described. A configuration of a camera main body 100 that is an image capturing apparatus according to the present embodiment, a lens unit 200, and a light emitting device 300, and a basic driving method thereof are similar to those of the foregoing first embodiment. The components will thus be denoted by the same reference numerals, and a description thereof will be omitted.

In general, the lower the shutter speed (the longer the exposure time), the more likely an image including a blurred object is to be obtained due to the effects of camera shakes and object motion during imaging. In other words, to reduce such motion blurs occurring in an image, the shutter speed is desirably as high as possible.

The camera main body 100 according to the present embodiment determines the ideal flicker reduction exposure time IdealFlkExpTime to be shorter than a predetermined exposure time by the flicker reduction exposure time determination processing according to the foregoing first embodiment. The predetermined exposure time may have any value that can reduce the effect of object motion in the image. In the present embodiment, the predetermined exposure time is $1/125$ sec, for example.

In the present embodiment, the processing related to the comparison with CurTv in the foregoing flicker reduction exposure time determination processing can be omitted. However, the camera main body 100 may be configured to determine the ideal flicker reduction exposure time IdealFlk-ExpTime to be an exposure time that is one of integer multiples of the ideal flicker reduction exposure time IdealFlkExpTime of which the difference from the current shutter speed CurTv falls within a predetermined range and is shorter than the predetermined exposure time.

The camera main body 100 may also be configured to set an ideal flicker reduction exposure time IdealFlkExpTime that reduces the effect of object motion if a blur-reducing condition (such as a specific imaging scene (sport scene)) is set as the imaging condition of the camera main body 100.

As described above, the camera main body 100 according to the present embodiment can detect flicker changing in light amount over a wide range of frequencies and capture images with reduced effect of flicker while reducing the effect of object motion in the images. With such a configuration, the camera main body 100 according to the present embodiment can facilitate setting a shutter speed that can reduce the effect of flicker without needing the user's additional operation even if a specific imaging condition intended to reduce blur is set. The camera main body 100 according to the present embodiment can thus capture images with reduced effect of flicker over a wide range of light amount change frequencies without needing complicated operations and reduce image unevenness due to flicker regardless of light sources.

In a seventh embodiment, flicker reduction processing during light emission imaging using a light emitting device 300 will be described. A configuration of a camera main body 100 that is an image capturing apparatus according to the present embodiment, a lens unit 200, and the light emitting device 300, and a basic driving method thereof are similar to those of the foregoing first embodiment. The components will thus be denoted by the same reference numerals, and a description thereof will be omitted.

In the light emission imaging using the light emitting device 300, settable flicker reduction shutter speeds are limited by synchronization speed determined based on the timing of exposure of the image sensor 101 and the timing of light emission from the light emitting device 300. In other words, the camera main body 100 according to the present embodiment sets a settable flicker reduction shutter speed SetPosFlkTv from among candidate shutter speeds lower than the synchronization speed of the light emitting device 300. Specifically, the CPU 103 determines whether to perform the light emission imaging using the light emitting device 300. If the light emission imaging is determined to be performed, the CPU 103 limits shutter speeds selectable in the shutter speed setting table to a range lower than the synchronization speed of the light emitting device 300.

In the present embodiment, the processing related to the comparison with CurTv in the foregoing flicker reduction exposure time determination processing can be omitted. However, the camera main body 100 may be configured to use one of integer multiples of the ideal flicker reduction exposure time IdealFlkExpTime of which the difference from the current shutter speed CurTv is the smallest and that is less than the synchronization speed of the light emitting device 300 as the final ideal flicker reduction exposure time IdealFlkExpTime.

As described above, the camera main body 100 according to the present embodiment can detect flicker changing in light amount over a wide range of frequencies and capture images with reduced effect of flicker while maintaining a state where the object is appropriately illuminated even during the light emission imaging using the light emitting device 300. With such a configuration, the camera main body 100 according to the present embodiment can facilitate setting a shutter speed that can reduce the effect of flicker during the light emission imaging without needing the user's additional operation. The camera main body 100 according to the present embodiment can thus capture images with reduced effect of flicker over a wide range of light amount change frequencies without needing complicated operations and reduce image unevenness due to flicker regardless of light sources.

While the embodiments of the present invention have been described above, the present invention is not limited to such embodiments, and various modifications and changes may be made within the gist thereof. For example, in the foregoing embodiments, digital cameras are described as examples of the image capturing apparatuses in which the present invention is implemented. However, this is not restrictive. For example, image capturing apparatuses other than digital cameras may be employed. Examples include a digital video camera, a portable device such as a smartphone, a wearable terminal, an on-vehicle camera, and a security camera.

In the foregoing embodiments, configurations that can detect and reduce flicker over a wide range of frequencies regardless of light sources have been described. However, this is not restrictive. For example, a specific light source may be specified in advance, and the image capturing apparatus may be configured to detect flicker in a frequency range where the flicker is likely to occur. For example, like the shutter speed setting table illustrated in FIG. 2, table data may be prepared for each light source (or each group of similar light sources). The image capturing apparatus then may be configured to limit the shutter speed to those likely to be set in each piece of table data by referring to the light amount change frequency of the light source. With such a configuration, a shutter speed that can reduce the effect of flicker can be efficiently set based on flicker likely to occur from each light source. This can reduce the data amount of the table data as much as possible while effectively reducing the effect of flicker.

In the foregoing embodiments, the operation of the entire image capturing apparatus is controlled by the components of the image capturing apparatus cooperating with each other, with the CPU 103 playing the central role. However, this is not restrictive. For example, a (computer) program based on the procedures illustrated in the foregoing diagrams may be stored in the ROM of the camera main body 100 in advance. A microprocessor such as the CPU 103 may be configured to execute the program to control the operation of the entire image capturing apparatus. The program is not limited to any particular form as long as the functions of the program are provided. Examples include object code, a program to be executed by an interpreter, and script data to be supplied to an operating system (OS). Examples of a recording medium for supplying the program may include magnetic recording media such as a hard disk and a magnetic tape, and optical/magneto-optical recording media.

In the foregoing embodiments, digital cameras are described as examples of the image capturing apparatuses in which the present invention is implemented. However, this is not restrictive. For example, various image capturing apparatuses may be employed, including a digital video camera, a portable device such as a smartphone, a wearable terminal, and a security camera.

OTHER EMBODIMENTS

An embodiment of the present invention can be implemented by supplying a program for implementing one or more functions of the foregoing embodiments to a system or an apparatus via a network or a recording medium, and reading and executing the program by one or more processors in a computer of the system or apparatus. A circuit for implementing the one or more functions (such as an ASIC) may be used for implementation.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to embodiments, it is to be understood that the invention is not limited to the disclosed embodiments but is defined by the scope of the following claims.

This application claims the benefit of Japanese Patent Application No. 2021-028809, filed Feb. 25, 2021, which is hereby incorporated by reference herein in its entirety.

What is claimed is:

1. An image capturing apparatus comprising:
an image sensor; and
at least one processor configured to perform operations of the following units:
a flicker detection unit configured to detect flicker that is a periodic change in a light amount of an object;
a determination unit configured to determine a first shutter speed based on a light amount change frequency of the flicker detected by the flicker detection unit, the first shutter speed being based on a reciprocal of the light amount change frequency of the detected flicker; and
a selection unit configured to select a second shutter speed as a candidate in capturing an image of the object with reduced effect of the flicker, based on the first shutter speed determined by the determination unit,
wherein the determination unit is configured to, if a third shutter speed of the image capturing apparatus is set in advance, determine a closer one of shutter speeds to the third shutter speed than the other shutter speeds as the first shutter speed, the shutter speeds being integer multiples of a shutter speed that is the reciprocal of the light amount change frequency of the flicker detected by the flicker detection unit, and
wherein the selection unit is configured to select one of settable shutter speeds of the image capturing apparatus as the second shutter speed, the selected one of settable shutter speeds having a smaller difference from the first shutter speed than the others shutter speeds.

2. The image capturing apparatus according to claim 1, wherein the at least one processor is further configured to function as:
a notification unit configured to, if the third shutter speed and the second shutter speed are different, make a notification of information about the second shutter speed.

3. The image capturing apparatus according to claim 2, wherein the notification unit is configured to make a notification of information about the third shutter speed.

4. The image capturing apparatus according to claim 2, wherein the notification unit is configured to make a notification of information about the light amount change frequency of the flicker detected by the flicker detection unit.

5. The image capturing apparatus according to claim 2, wherein the notification unit is configured to make a notification of information about at least one of a plurality of candidate shutter speeds among the settable shutter speeds of the image capturing apparatus aside from the second shutter speed, the plurality of candidate shutter speeds corresponding to the shutter speeds that are the integer multiples of the shutter speed that is the reciprocal of the light amount change frequency of the flicker detected by the flicker detection unit.

6. The image capturing apparatus according to claim 2, further comprising a display device,
wherein the notification unit
is configured to make various notifications to a user by displaying a notification screen on the display device.

7. The image capturing apparatus according to claim 6, wherein the display device is configured to provide a live view display based on a captured image of the object obtained using the image sensor, and display a result of detection by the flicker detection unit on a predetermined icon displayed during the live view display.

8. The image capturing apparatus according to claim 7, wherein the display device is configured to display the notification screen based on a pressing operation of the user on the predetermined icon.

9. The image capturing apparatus according to claim 2, wherein the at least one processor is further configured to function as:
a control unit configured to control change in a shutter speed of the image capturing apparatus,
wherein the control unit is configured to change the shutter speed of the image capturing apparatus to one of shutter speeds notified by the notification unit, the change to a shutter speed being instructed by a user.

10. The image capturing apparatus according to claim 2, wherein the notification unit is configured to, if no flicker of a predetermined level or higher is detected by the flicker detection unit, make a notification that no flicker is detected.

11. The image capturing apparatus according to claim 1, wherein the at least one processor is further configured to function as:
a control unit configured to control change in shutter speeds,
wherein the control unit is configured to change the third shutter speed set in the image capturing apparatus to the second shutter speed based on an instruction of a user.

12. The image capturing apparatus according to claim 1, wherein the determination unit is configured to, if the third shutter speed is not set in advance by a manual operation of a user, determine the shutter speed that is the reciprocal of the light amount change frequency of the flicker detected by the flicker detection unit as the first shutter speed.

13. The image capturing apparatus according to claim 12, wherein the determination unit is configured to, if the third shutter speed is not set in advance by the manual operation of the user, select one of the settable shutter speeds of the image capturing apparatus as the second shutter speed, the selected one of settable shutter speeds having a higher effect of reducing the effect of the flicker than a closest of the settable shutter speeds to the first shutter speed.

14. The image capturing apparatus according to claim 1, wherein the determination unit is configured to, in obtaining a moving image without the third shutter speed being set in advance by a manual operation of a user, determine a lowest shutter speed settable based on a frame rate of the moving image among the shutter speeds that are the integer multiples of the shutter speed that is the reciprocal of the light amount change frequency of the flicker detected by the flicker detection unit as the first shutter speed.

15. The image capturing apparatus according to claim 1, wherein the determination unit is configured to, if the third shutter speed is not set in advance by a manual operation of a user and a condition for reducing an effect of object motion is set in the image capturing apparatus, determine a fastest of the shutter speeds that are the integer multiples of the shutter speed that is the reciprocal of the light amount change frequency of the flicker detected by the flicker detection unit as the first shutter speed.

16. The image capturing apparatus according to claim 1, further comprising a mechanical shutter to be used to control exposure and light shielding of the image sensor based on a set shutter speed,
wherein the selection unit is configured to, in capturing the image of the object using the mechanical shutter, select one of the settable shutter speeds of the image capturing apparatus higher than or equal to a predetermined speed as the second shutter speed, the selected one of settable shutter speeds having a smaller difference from the first shutter speed than the other shutter speeds.

17. The image capturing apparatus according to claim 1, wherein the selection unit is configured to, in capturing the image in a state where the object is illuminated using a light emission device, select one of the settable shutter speeds of the image capturing apparatus lower than a synchronization speed of the light emitting device as the second shutter speed, the selected one of settable shutter speeds having a smaller difference from the first shutter speed than the other shutter speeds.

18. An image capturing apparatus comprising:
an image sensor;
at least one processor configured to perform operations of the following units:
a flicker detection unit configured to detect flicker that is a periodic change in a light amount of an object;
a determination unit configured to determine a first shutter speed based on a light amount change frequency of the flicker detected by the flicker detection unit, the first shutter speed being based on a reciprocal of the light amount change frequency of the detected flicker;
a selection unit configured to select a second shutter speed as a candidate in capturing an image of the object with reduced effect of the flicker based on the first shutter speed determined by the determination unit; and
a notification unit configured to, if a third shutter speed of the image capturing apparatus set in advance and the second shutter speed are different, make a notification of information about the second shutter speed.

19. The image capturing apparatus according to claim 18, wherein the notification unit is configured to make a notification of information about the third shutter speed.

20. The image capturing apparatus according to claim 18, wherein the notification unit is configured to make a notification of information about the light amount change frequency of the flicker detected by the flicker detection unit.

21. The image capturing apparatus according to claim 18, wherein the notification unit is configured to make a notification of information about a plurality of candidate shutter speeds among settable shutter speeds of the image capturing apparatus aside from the second shutter speed, the plurality of candidate shutter speeds corresponding to shutter speeds that are integer multiples of a shutter speed that is the reciprocal of the light amount change frequency of the flicker detected by the flicker detection unit.

22. The image capturing apparatus according to claim 18, further comprising a display device,
wherein the notification unit is configured to make various notifications to a user by displaying a notification screen on the display device.

23. The image capturing apparatus according to claim 22, wherein the display device is configured to provide a live view display based on a captured image of the object obtained using the image sensor, and display a result of detection by the flicker detection unit on a predetermined icon displayed during the live view display.

24. The image capturing apparatus according to claim 23, wherein the display device is configured to display the notification screen based on a pressing operation of the user on the predetermined icon.

25. A method of controlling an image capturing apparatus that includes an image sensor, the method comprising:
 detecting flicker that is a periodic change in a light amount of an object;
 obtaining a first shutter speed based on a light amount change frequency of the detected flicker as first obtaining, the first shutter speed being based on a reciprocal of the light amount change frequency of the detected flicker;
 obtaining a second shutter speed as a candidate for capturing an image of the object with reduced effect of the flicker based on the obtained first shutter speed as second obtaining;
 in the first obtaining, if a third shutter speed is set in advance, determining a closer one of shutter speeds to the third shutters peed than the other shutter speeds as the first shutter speed, the shutter speeds being integer multiples of a shutter speed that is the reciprocal of the light amount change frequency of the detected flicker; and
 in the second obtaining, selecting one of settable shutter speeds of the image capturing apparatus as the second shutter speed, the selected one of settable shutter speeds having a smaller difference from the first shutter speed than the other shutter speeds.

26. A method of controlling an image capturing apparatus, the method comprising:
 detecting flicker that is a periodic change in a light amount of an object;
 obtaining a first shutter speed based on a light amount change frequency of the detected flicker, the first shutter speed being based on a reciprocal of the light amount change frequency of the detected flicker;
 obtaining a second shutter speed as a candidate in capturing an image of the object with reduced effect of the flicker based on the obtained first shutter speed; and
 if a third shutter speed set in advance and the second shutter speed are different, making a notification including information about the second shutter speed.

27. A non-transitory computer-readable storage medium storing a program for causing a processor to execute a method of controlling an image capturing apparatus that includes an image sensor, the method comprising:
 detecting flicker that is a periodic change in a light amount of an object;
 obtaining a first shutter speed based on a light amount change frequency of the detected flicker as first obtaining, the first shutter speed being based on a reciprocal of the light amount change frequency of the detected flicker;
 obtaining a second shutter speed as a candidate for capturing an image of the object with reduced effect of the flicker based on the obtained first shutter speed as second obtaining;
 in the first obtaining, if a third shutter speed is set in advance, determining a closer one of shutter speeds to the third shutter speed than the other shutter speeds as the first shutter speed, the shutter speeds being integer multiples of a shutter speed that is the reciprocal of the light amount change frequency of the detected flicker; and
 in the second obtaining, selecting one of settable shutter speeds of the image capturing apparatus as the second shutter speed, the selected one of settable shutter speeds having a smaller difference from the first shutter speed than the other shutter speeds.

28. A non-transitory computer-readable storage medium storing a program for causing a processor to execute a method of controlling an image capturing apparatus, the method comprising:
 detecting flicker that is a periodic change in a light amount of an object;
 obtaining a first shutter speed based on a light amount change frequency of the detected flicker, the first shutter speed being based on a reciprocal of the light amount change frequency of the detected flicker;
 obtaining a second shutter speed as a candidate in capturing an image of the object with reduced effect of the flicker based on the obtained first shutter speed; and
 if a third shutter speed set in advance and the second shutter speed are different, making a notification including information about the second shutter speed.

* * * * *